US008060433B2

(12) United States Patent
Conitzer et al.

(10) Patent No.: US 8,060,433 B2
(45) Date of Patent: Nov. 15, 2011

(54) METHOD OF DETERMINING AN EXCHANGE ALLOCATION THAT PROMOTES TRUTHFUL BIDDING AND IMPROVES THE OBTAINMENT OF EXCHANGE OBJECTIVES

(75) Inventors: Vincent Conitzer, Durham, NC (US); Tuomas Sandholm, Pittsburgh, PA (US)

(73) Assignee: CombineNet, Inc., Pittsburgh, PA (US)

( * ) Notice: Subject to any disclaimer, the term of this patent is extended or adjusted under 35 U.S.C. 154(b) by 631 days.

(21) Appl. No.: 11/649,082

(22) Filed: Jan. 3, 2007

(65) Prior Publication Data
US 2008/0162328 A1    Jul. 3, 2008

(51) Int. Cl.
 *G06Q 40/00* (2006.01)
(52) U.S. Cl. ............... 705/37; 705/1; 705/8; 705/26
(58) Field of Classification Search ............. 705/35–45, 705/1, 8, 26
See application file for complete search history.

(56) References Cited

U.S. PATENT DOCUMENTS

| | | | | |
|---|---|---|---|---|
| 5,905,975 A * | 5/1999 | Ausubel | ............. | 705/37 |
| 6,021,398 A * | 2/2000 | Ausubel | ............. | 705/37 |
| 6,101,484 A * | 8/2000 | Halbert et al. | ............. | 705/26 |
| 6,415,270 B1 | 7/2002 | Rackson et al. | ............. | 705/36 R |
| 6,718,312 B1 * | 4/2004 | McAfee et al. | ............. | 705/37 |
| 7,010,505 B2 * | 3/2006 | Boutilier et al. | ............. | 705/26 |
| 7,062,461 B1 * | 6/2006 | Ausubel | ............. | 705/37 |
| 7,085,740 B1 * | 8/2006 | Meyers | ............. | 705/37 |
| 7,165,046 B2 * | 1/2007 | Ausubel | ............. | 705/37 |
| 7,249,027 B1 * | 7/2007 | Ausubel | ............. | 705/1 |
| 7,343,342 B2 * | 3/2008 | Ausubel | ............. | 705/37 |
| 2002/0052828 A1 * | 5/2002 | Ausubel | ............. | 705/37 |
| 2002/0116317 A1 * | 8/2002 | May | ............. | 705/37 |
| 2003/0195835 A1 * | 10/2003 | Sandholm et al. | ............. | 705/37 |
| 2004/0054551 A1 * | 3/2004 | Ausubel et al. | ............. | 705/1 |
| 2004/0059665 A1 * | 3/2004 | Suri et al. | ............. | 705/37 |

(Continued)

FOREIGN PATENT DOCUMENTS
WO    WO2008/005712    *   1/2008

OTHER PUBLICATIONS

Parkes, D.C.; Ungar, L.H. Preventing StrategicManipulation in Iterative Auctions: Proxy Agents and Price-adjustment. Proceedings Seventeenth National Conference on Artificial Intelligence (AAAI-2000). Twelfth Innovative Applications of Artificial Intelligence Conference. pp. 82-89. © 2000.*

*Primary Examiner* — Charles Kyle
*Assistant Examiner* — Robert Niquette
(74) *Attorney, Agent, or Firm* — The Webb Law Firm

(57) ABSTRACT

In an apparatus and method of solving a combinatorial exchange, a plurality of candidate allocations of input bids is determined from input bids and a set of bid vectors is formed from the input bids. A probability value, representing how likely the bids of a bid vector will comprise the bids from which a final allocation is determined, is associated with each bid vector. A mapping is then determined between each bid vector and at least one of the candidate allocations based on a set of objectives and a set of constraints. A candidate allocation is selected as a final allocation based on a comparison of another set of bids that define an exchange event bid vector with at least one of the bid vectors.

28 Claims, 12 Drawing Sheets

U.S. PATENT DOCUMENTS

| | | |
|---|---|---|
| 2004/0193529 A1* | 9/2004 | Asher et al. ............ 705/37 |
| 2004/0267658 A1* | 12/2004 | Sandholm et al. ............ 705/37 |
| 2005/0102215 A1* | 5/2005 | Ausubel et al. ............ 705/37 |
| 2005/0119966 A1* | 6/2005 | Sandholm et al. ............ 705/37 |
| 2006/0136320 A1* | 6/2006 | Saberi et al. ............ 705/37 |
| 2006/0167784 A1* | 7/2006 | Hoffberg ............ 705/37 |
| 2006/0167787 A1* | 7/2006 | Ausubel ............ 705/37 |
| 2006/0224496 A1* | 10/2006 | Sandholm et al. ............ 705/37 |
| 2007/0011080 A1* | 1/2007 | Jain et al. ............ 705/37 |
| 2008/0262893 A1* | 10/2008 | Hoffberg ............ 705/8 |

* cited by examiner

METHOD OF DETERMINING AN EXCHANGE ALLOCATION THAT PROMOTES TRUTHFUL BIDDING AND IMPROVES THE OBTAINMENT OF EXCHANGE OBJECTIVES

BACKGROUND OF THE INVENTION

1. Field of the Invention

The present invention relates to exchanges, e.g., forward auctions, reverse auctions and/or pure exchanges, especially combinatorial exchanges, and, more particularly, to a method for discouraging bidders and bid takers from attempting to manipulate the exchange results by pricing one or more bids in a manner that does not reflect (or express) the actual valuation of the item(s) of each bid while improving the obtainment of auction objectives.

2. Description of Related Art

One problem with combinatorial exchanges, e.g., forward auctions, reverse auctions and/or pure exchanges, is that a bidder often bids strategically, namely, he will not reveal his true cost for providing an item in a reverse auction or his true value for acquiring an item in a forward auction. Rather, in a reverse auction, bidders bid the highest price they believe they can sell items for and in a forward auction bidders bid the lowest price they believe they can acquire the items for. As used herein, "exchange" means a forward auction, a reverse auction and/or pure exchange i.e., a combined forward auction and reverse auction.

In a reverse auction, a bid taker may have some knowledge about a bidder's true cost, which could be utilized to reduce total procurement cost, for instance, by bargaining with the bidder. Similarly, in a forward auction the bid taker may have some knowledge about one or more bidders' true values, which could be utilized to increase the total procurement revenue. Unfortunately, a key shortcoming of prior art combinatorial exchanges is that they do not enable bidders and/or bid takers to make any use of this knowledge.

For example, consider a reverse auction where there are only two bidders A and B bidding to supply one item, and bidder A has a much lower cost of production than bidder B, and the bid taker, as well as bidder A, knows this. If this reverse auction is run, bidder A will bid a price only slightly below the best price that bidder B can bid. This may not be satisfactory to the bid taker, and he may choose instead to enter a less systematic bargaining process with the bidders in order to drive bidder A down to a lower price. Alternatively, the bid taker may also run a non-binding auction and enter a less systematic negotiation process with the bidders afterwards, but this will cause the auction and the bids in it to lose credibility and meaning.

The same phenomenon also occurs in the more complex combinatorial exchange setting. Here, any ad-hoc negotiation process is certain not to lead to economically efficient allocations because of the complexities inherent in finding such allocations. Thus, the inability of combinatorial exchanges to let bidders and/or bid takers exploit their knowledge about the respective bid takers and/or bidders prevents adoption of suitable combinatorial market clearing technology and, as a result, leads to economic loss.

What is, therefore, needed, and not heretofore available, is a method for solving exchanges, especially combinatorial exchanges, that enables knowledge or suspicions of preferences of bidders and/or bid takers to be taken in account when determining an allocation. Desirably, the present invention encourages bidders to bid their true valuation and bid takers to obtain more competitive outcomes. Still other advantages of the present invention will become apparent to those of ordinary skill in the art upon reading and understanding the following detailed description.

SUMMARY OF THE INVENTION

The invention is a method of determining an allocation in a combinatorial exchange. The method includes (a) inputting a first set of bids, with each bid including at least one item, a quantity for each item and a price for all of the item(s) and their quantities; (b) determining a plurality of candidate allocation of the bids; (c) defining a set of exchange objectives and a set of exchange constraints; (d) forming a set of bid vectors, with each bid vector of said set comprising a unique subset of the bids input in step (a); (e) associating with each bid vector a probability value representing how likely it is the bids of said bid vector will comprise the bids from which a final allocation is determined; and (f) determining a mapping between each bid vector and at least one of the candidate allocations, wherein said mapping optimizes the set of objectives and satisfies the set of constraints, and said mapping is determined as a function of the probability values of the bid vectors, the set of objectives, the set of constraints and the candidate allocations.

In the method, the plurality of candidate allocation of the bids can be determined based on another set of objectives and another set of constraints.

The method can further include: (g) in connection with an actual exchange event, receiving a second set of bids that defines an exchange event bid vector, with each bid of the second set of bids including at least one item, a quantity for each item, and a price for all of the item(s) and their quantities; (h) comparing the exchange event bid vector to at least one of the bid vectors; and (i) selecting one candidate allocation as the final allocation based on the comparison in step (h) and the mapping in step (f).

The set of constraints can include one or more constraints on (1) one or more attributes of one or more items of one or more of the input bids and/or (2) on one or more attributes of one or more of the input bids, wherein an item attribute relates to a quality or characteristic of the corresponding item and a bid attribute relates to a quality or characteristic of the corresponding bid.

Step (h) can include comparing the items, the quantity of each item and the price of each bid of the exchange event bid vector to the items, the quantity of each item and the price of each bid of the at least one bid vector. Step (i) can include selecting as the final allocation the one candidate allocation to which the one bid vector is mapped that has the items, the quantity of each item and the price of the bids thereof that most closely match the items, the quantity of each item and the price of the bids of the exchange event bid vector.

Where the exchange event bid vector and the one bid vector each has an attribute associated therewith or with an item thereof, step (h) includes comparing the items, the quantity of each item, the price of each bid of the exchange event bid vector (EEBV) and any attribute(s) associated with the EEBV or an item thereof to the items, the quantity of each item, the price of each bid of the one bid vector and any attribute(s) associated with the one bid vector or an item thereof and step (i) includes selecting as the final allocation the one candidate allocation to which the one bid vector is mapped that has the items, the quantity of each item, the price of the bids thereof and any attribute(s) thereof that most closely match the items, the quantity of each item, the price of the bids and any attribute(s) of the EEBV.

The final allocation can include the quantity of each item allocated to each bidder having a bid included in the exchange event bid vector and the price each said bidder pays.

In a forward auction, the price each bidder pays for all of the bids of said bidder included in the final allocation is less than or equal to the price bid for all of said bids of said bidder included in the exchange event bid vector. In a reverse auction, the price each bidder is paid for all of the bids of said bidder included in the final allocation is greater than or equal to the price bid for all of said bids of said bidder included in the exchange event bid vector.

Step (f) can be repeated with a different set of objectives and/or with a different set of constraints for each repetition thereof until a desired mapping is determined.

Except for the participation constraint(s) and/or the truth-promotion constraint(s), each set of constraints can be the same.

Each bid vector can include all or less than all of the bids input in step (a).

The set of constraints can include a plurality of first participation constraints or a plurality of second participation constraints. The plurality of either the first or second participation constraints causes each bidder to be better off participating in the exchange than not participating in the exchange. The plurality of first participation constraints is such that the bidder gets higher utility from participating than not, regardless of how others bid. The plurality of second participation constraints is such that the bidder gets higher utility from participating than not, in expectation over other bidders' truthful bids. Each second participation constraint is comprised of at least two first participation constraints each of which is combined with a probability value associated with at least one bid of a bidder represented by said first participation constraint.

Each participation constraint requires at least one of (i) in a forward auction, the bidder of a bid included in the final allocation shall not pay more than the price the bidder included in said bid; (ii) in a reverse auction, the bidder of a bid included in the final allocation shall not be paid less than the price the bidder included in said bid; (iii) in a forward auction, the bidder of a bid included in the final allocation shall not be awarded less than the quantity of at least one item the bidder included in said bid; and (iv) in a reverse auction, the bidder of a bid included in the final allocation shall not be awarded more than the quantity of at least one item the bidder included in said bid.

In a forward auction, a bidder's utility is the price that expresses the value that the bidder believes the item(s) of the bid are worth minus the price the bidder pays for the bid. In a reverse auction, a bidder's utility is the price the bidder is paid for the bid minus the price that expresses a value that the bidder believes the items of the bid are worth. A bidder is better off when the bidder's utility for a bid that includes a price that expresses the bidder's true valuation is at least zero.

The set of constraints can include (i) a plurality of first truth-promotion constraints or (ii) a plurality of second truth-promotion constraints. The plurality of either the first or second truth-promotion constraints causes each bidder to be better off bidding a value for a bid that expresses the bidder's true valuation for said bid. In connection with the plurality of first truth-promotion constraints, the bidder is better off bidding truthfully regardless of how others bid. In connection with the plurality of second truth-promotion constraints, the bidder is better off bidding truthfully, in expectation over other bidders' truthful bids. Each second truth-promotion constraint is comprised of at least two first truth-promotion constraints each of which is combined with a probability value associated with at least one bid of a bidder represented by said first truth-promotion constraint.

Each truth-promotion constraint requires that the bidder of a bid that includes a price that does not express the bidder's true valuation shall not be better off in the final allocation than if said bid included a price that expresses the bidder's true valuation.

Except for the participation constraint(s) and the truth-promotion constraint(s), each set of constraints is the same.

The first and second sets of objectives can be the same. Also or alternatively, each set of objectives can consist of one objective.

Step (f) can include: providing an optimizing routine; inputting the probability value associated with each bid vector of the second subset of bid vectors, the second set of objectives, the second set of constraints and the candidate allocations into the optimizing routine; and causing the optimizing routine to determine the mapping as a function of said inputs.

The optimizing routine can be the CPLEX® optimizer or the Xpress-MP™ optimizer.

The invention is also a computer system for determining an allocation in a combinatorial exchange. The computer system includes means for receiving a first set of bids, with each bid including at least one item, a quantity for each item and a value for all of the item(s) and their quantities; means for storing a plurality of bid vectors each of which comprises a unique subset of the first set of bids; means for determining at least one candidate allocation of the bids of a first subset of the bid vectors; means for associating with each bid vector of a second subset of the bid vectors a probability value representing the likelihood that a final allocation of bids will be determined from the bids associated with said bid vector; means for determining a mapping from each bid vector of the second subset of the bid vectors to at least one of the candidate allocations, wherein said mapping optimizes a set of objectives and satisfies a set of constraints; means for receiving a second set of bids that defines an exchange event bid vector in connection with an exchange event; and means for designating as the final allocation at least one candidate allocation to which the bid vector of the second subset of bid vectors that most closely matches the exchange event bid vector is mapped.

Each candidate allocation can be determined based on another set of objectives and another set of constraints.

The set of constraints includes one or more constraints on (i) one or more attributes of one or more items of one or more of the received bids and/or (ii) on one or more attributes of one or more of the received bids, wherein an item attribute relates to a quality or characteristic of the corresponding item and a bid attribute relates to a quality or characteristic of the corresponding bid.

The mapping can be determined as a function of the probability values of the bid vectors of the second subset of bid vectors, the set of objectives, the set of constraints and the candidate allocations.

The set of constraints can include one of (i) a plurality of first participation constraints and (ii) a plurality of second participation constraints. The plurality of either the first or second participation constraints causes each bidder to be better off participating in the exchange than not participating in the exchange. The plurality of first participation constraints is such that the bidder gets higher utility from participating than not, regardless of how others bid. The plurality of second participation constraints is such that the bidder gets higher utility from participating than not, in expectation over other bidders' truthful bids. Each second participation constraint is comprised of at least two first participation constraints each of which is combined with a probability value associated with at least one bid of a bidder represented by said first participation constraint.

Each participation constraint requires at least one of: in a forward auction, the bidder of a bid included in the final allocation shall not pay more than the price the bidder included in said bid; in a reverse auction, the bidder of a bid included in the final allocation shall not be paid less than the price the bidder included in said bid; in a forward auction, the bidder of a bid included in the final allocation shall not be awarded less than the quantity of at least one item the bidder included in said bid; and, in a reverse auction, the bidder of a bid included in the final allocation shall not be awarded more than the quantity of at least one item the bidder included in said bid.

In a forward auction, a bidder's utility is the price that expresses the value that the bidder believes the item(s) of the bid are worth minus the price the bidder pays for the bid. In a reverse auction, a bidder's utility is the price the bidder is paid for the bid minus the price that expresses a value that the bidder believes the item(s) of the bid are worth. A bidder is better off when the bidder's utility for a bid that includes a price that expresses the bidder's true valuation is at least zero.

The set of constraints can include one of (i) a plurality of first truth-promotion constraints and (ii) a plurality of second truth-promotion constraints. The plurality of either the first or second truth-promotion constraints causes each bidder to be better off bidding a value for a bid that expresses the bidder's true valuation for said bid. In connection with the plurality of first truth-promotion constraints, the bidder is better off bidding truthfully regardless of how others bid. In connection with the plurality of second truth-promotion constraints, the bidder is better off bidding truthfully, in expectation over other bidders' truthful bids. Each second truth-promotion constraint is comprised of at least two first truth-promotion constraints each of which is combined with a probability value associated with at least one bid of a bidder represented by said first truth-promotion constraint.

Each truth-promotion constraint requires that the bidder of a bid including a value that does not reflect the bidder's true valuation shall not be better off in the final allocation than if said bid included a value that reflects the bidder's true valuation.

In a forward auction, a bidder's utility is the price that expresses the value that the bidder believes the item(s) of the bid are worth minus the price the bidder pays for the bid. In a reverse auction, a bidder's utility is the price the bidder is paid for the bid minus the price that expresses a value that the bidder believes the item(s) of the bid are worth.

The truth-promotion constraint for each bidder is instantiated by one of the following equations:

$$v(B(\text{truth}))-\text{pay}(\text{truth}) \geq v(B(\text{lie}))-\text{pay}(\text{lie}), \text{ in a forward auction;}$$

or $$v(B(\text{truth}))-\text{pay}(\text{truth}) \leq v(B(\text{lie}))-\text{pay}(\text{lie}), \text{ in a reverse auction;}$$

where $v(B(\text{truth}))$=the value (v) of a bundle (B) of at least one item and its associated quantity awarded to the bidder when he is bidding his true valuation;

pay(truth)=the value the bidder pays or is paid if he is bidding truthfully in a forward auction or a reverse auction, respectively;

$v(B(\text{lie}))$=the value (v) of a bundle (B) of at least one item and its associated quantity awarded to the bidder when he is not bidding his true valuation; and pay(lie)=the value the bidder pays or is paid if he is not bidding truthfully in a forward auction or a reverse auction, respectively.

The means for mapping can determine a plurality of mappings utilizing a different set of objectives and/or with a different set of constraints for each mapping until a desired mapping is found.

Each subset of bid vectors can include all or less than all of the stored bid vectors.

The means for mapping can include: means for storing an optimizing routine; means for inputting the probability value associated with each bid vector of the second subset of bid vectors, the set of objectives, the set of constraints and the candidate allocations into the optimizing routine; and means for causing the optimizing routine to determine the mapping as a function of said inputs.

Each set of objectives can be the same. Except for the participation constraint(s) and the truth-promotion constraint(s), each set of constraints can be the same.

DETAILED DESCRIPTION OF THE INVENTION

In a combinatorial exchange, one or more rules can be associated with one or more bids of the exchange to facilitate the bidder of each of said bids being able to express his or her true or actual preferences. Examples of such rules associated with "Exchange Description Data" (EDD) that is associated with one or more bids received from bidders and/or received from one or more bid takers are described in U.S. patent application Ser. No. 10/803,549, filed Mar. 18, 2004, and in U.S. patent application Ser. No. 10/254,241, filed Sep. 25, 2002, both of which are incorporated herein by reference.

The ability to associate rules with bids enables bidders and/or bid takers to express their true preferences in a manner whereupon a software program, i.e., an optimizing routine, utilized to determine the allocation of bids can take these rules into account when determining said allocation.

While the ability to associate rules with bids and to determine an allocation based on said rules advances the art of determining an allocation of the bids in a combinatorial exchange, the use of a known set of exchange objectives to determine the allocation encourages bidders to bid strategically versus truthfully in an attempt to improve their chance of having one or more bids included in the final allocation or the price of one or more bids included in the final allocation. However, such strategic bidding may not be in the best economic interest of one or more bidders and/or one or more bid takers.

A method of determining an allocation in a combinatorial exchange that promotes truthful bidding will now be described with reference to the accompanying figures where like reference numbers correspond to like elements.

Figure 1:
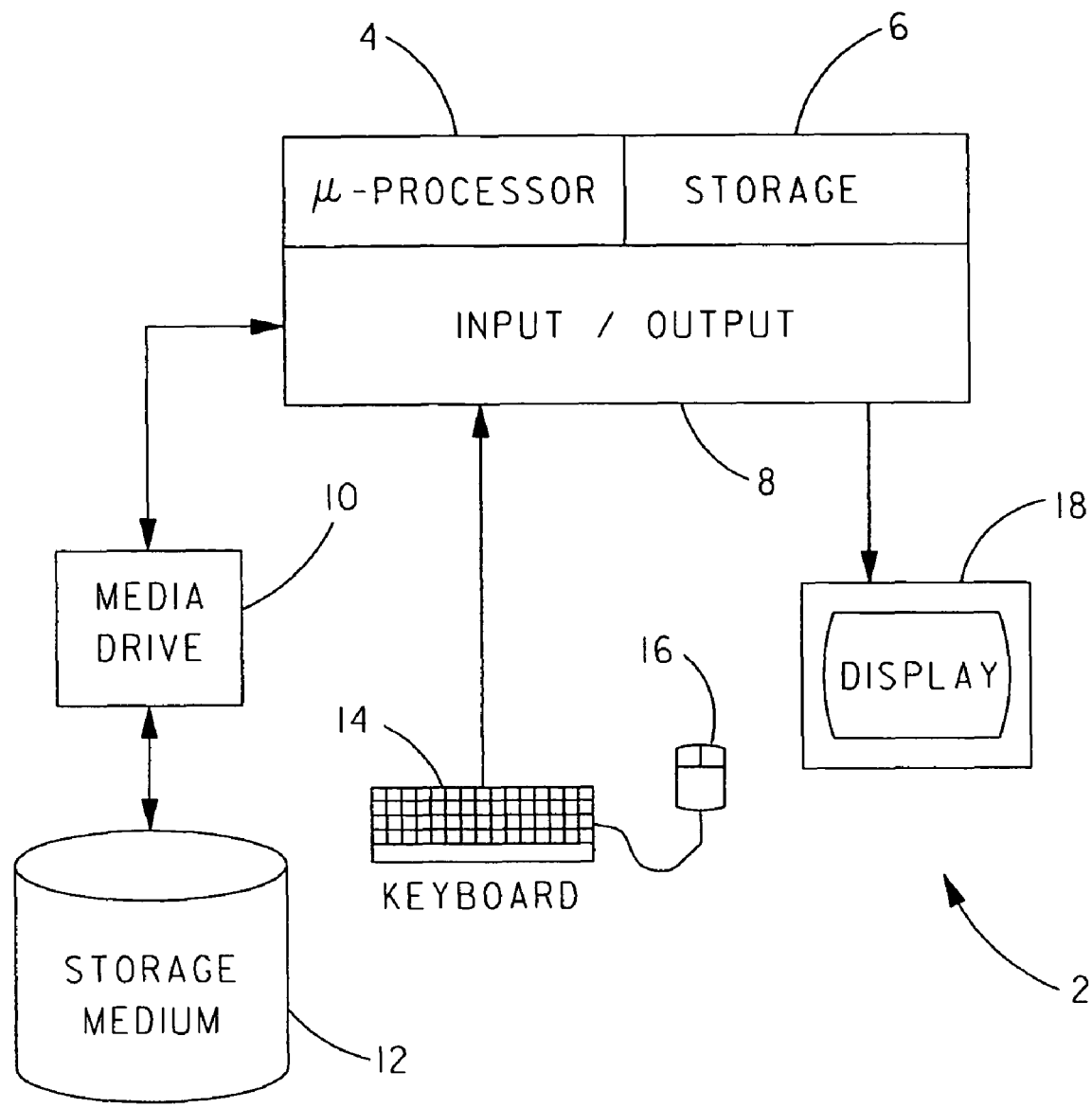
FIG. 1 is a block diagram of an exemplary computer that can be utilized by each participant, i.e., bidder, bid taker or exchange manager, in a combinatorial exchange.

With reference to FIG. 1, the present invention is embodied in computer software which executes on one or more standalone or networked computers 2. Each computer 2 includes a microprocessor 4, a computer storage 6 and an input/output system 8. Each computer 2 can also include a media drive 10, such as a disk drive, CD-ROM drive, and the like. Media drive 10 can operate with a computer storage medium 12 capable of storing the computer software that embodies the present invention, which computer software is able to configure and operate computer 2 in a manner to implement the present invention. Input/output system 8 can include a keyboard 14, a mouse 16 and/or a display 18. Computer 2 is exemplary of computers capable of executing the computer software of the present invention and is not to be construed as limiting the invention.

Figures 2, 3:
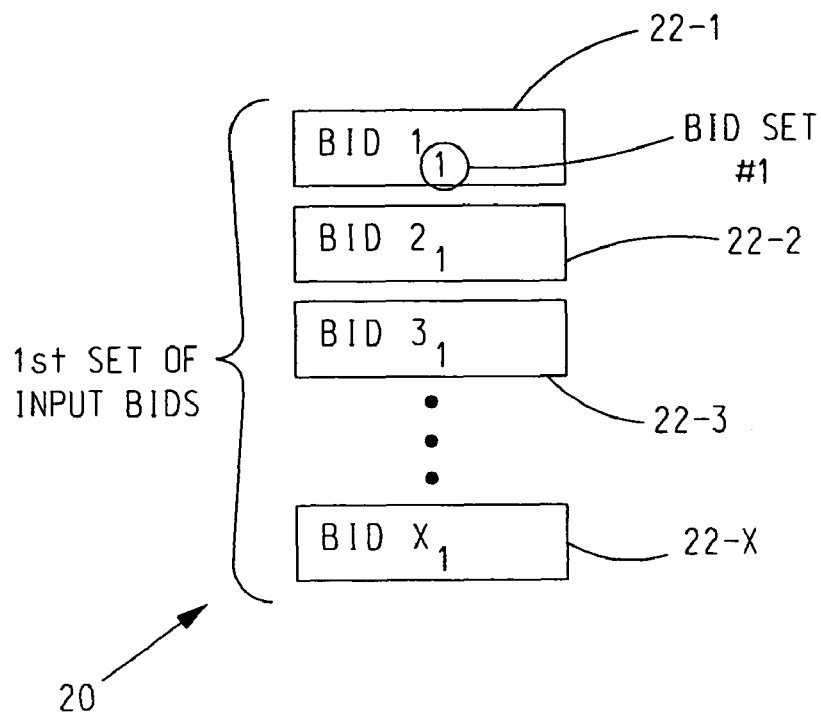
FIG. 2 is a block diagram of bids of a first set of input bids.
FIG. 3 is a block diagram of one of the bids in FIG. 2.

With reference to FIG. 2, and with continuing reference to FIG. 1, a first set of bids 20 is input into or received by computer 2 operating under the control of the computer software. As shown in FIG. 3 for bid 22-1 of the first set of bids 20, each bid 22 of the first set of bids 20 includes at least one item, a quantity for each item and the price for all of the items and their quantities.

Figure 4:
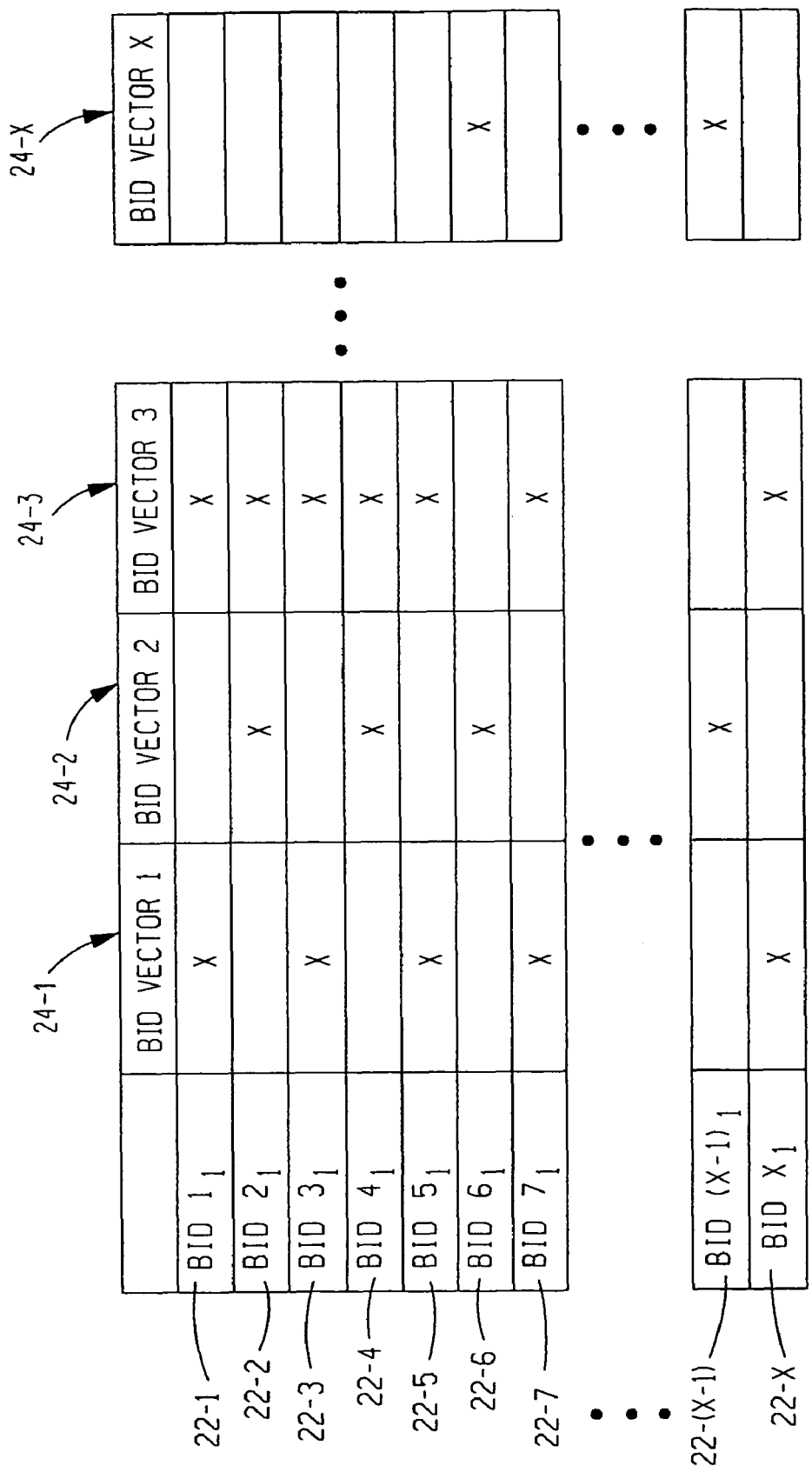
FIG. 4 is a graph of a plurality of bid vectors and the bids associated with each bid vector.

With reference to FIG. 4 and with continuing reference to FIGS. 2 and 3, next, under the control of the computer software, computer 2 either automatically forms a plurality of bid vectors 24 or enables a user of computer 2 to form a plurality of bid vectors 24. Each bid vector 24 comprises a unique subset of bids 22 of the first set of bids 20. For example, bid vector 24-1 includes bids 22-1, 22-3, 22-5, 22-7, . . . and 22-$x$; bid vector 24-2 includes bids 22-2, 22-4, 22-6, . . . and 22-($x$−1); bid vector 24-3 includes bids 22-1, 22-2, 22-3, 22-4, 22-5, 22-7, . . . and 22-$x$; and bid vector 24-$x$ includes bids 22-6, . . . and 22-($x$−1).

As can be seen, each bid vector 24 includes a different subset of bids 22 selected from the first set of bids 20. Each bid 22 may be included in one or more bid vectors 24 as desired.

Figure 5:
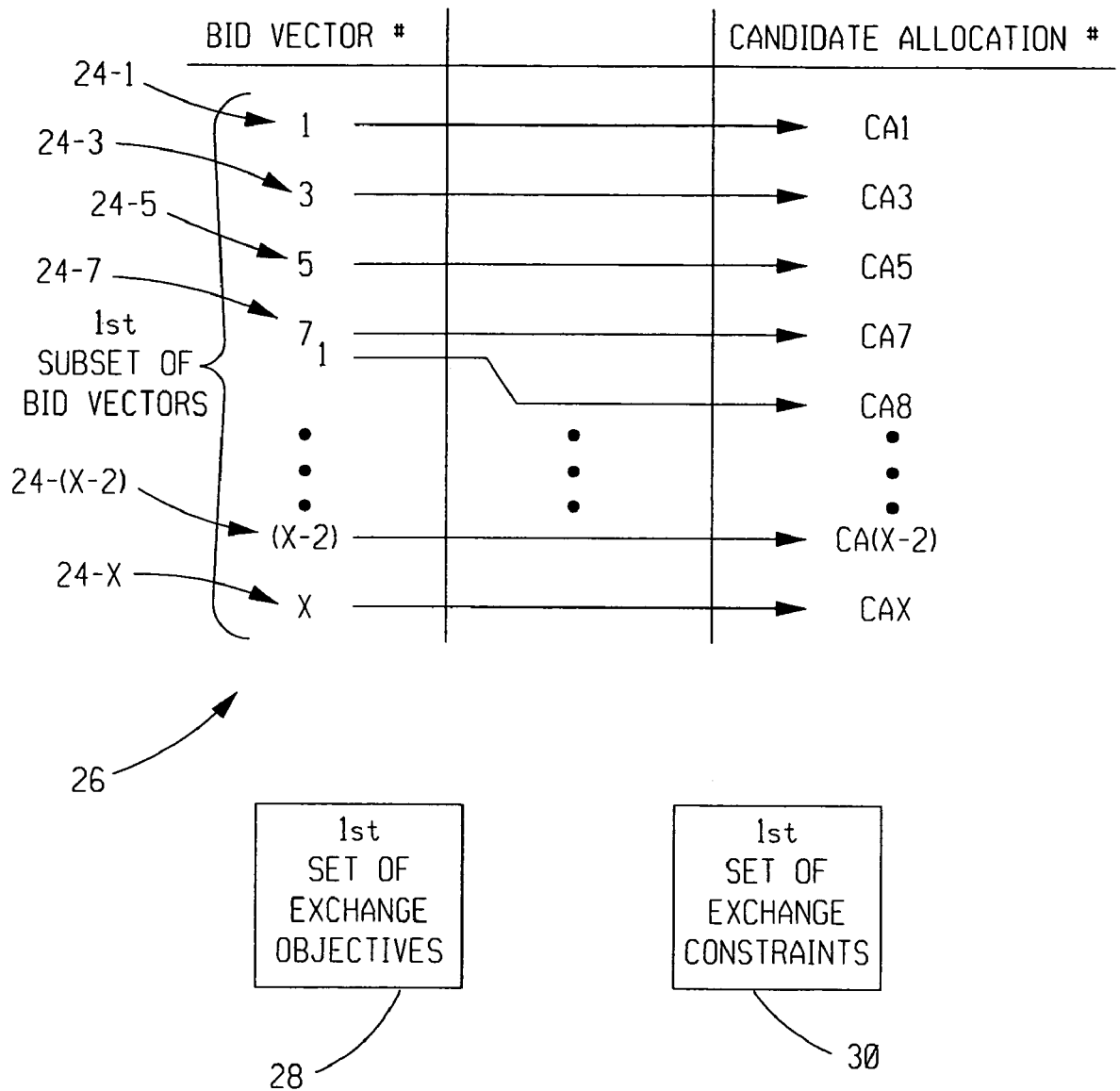
FIG. 5 is an illustration of candidate allocations that are determined by a suitable optimizing routine for each bid vector of a first subset of the bid vectors of FIG. 4 subject to a first set of auction objectives and a first set of auction constraints.

With reference to FIG. 5 and with continuing reference to FIGS. 2-4, a first subset of bid vectors 26 is then defined in computer 2 from the bid vectors 24 shown in FIG. 4. For example, in FIG. 5, the first subset of bid vectors includes bid vectors 24-1, 24-3, 24-5, 24-7, . . . , 24-($x$−2), and 24-$x$. For each bid vector 24 of the first subset of bid vectors 26, at least one candidate allocation (CA) of the bids of said bid vector 24 is determined subject to a first set of exchange objectives 28 and a first set of exchange constraints (or rules) 30. Each candidate allocation CA is determined via an optimizing routine, such as the CPLEX® optimizer available from ILOG, Inc., 1080 Linda Vista Avenue, Mountain View, Calif. 94043, or the Xpress-MP™ optimizer available from Dash Optimization, Inc., 560 Sylvan Avenue, Englewood Cliffs, N.J. 07632. In the U.S., CPLEX® is a Registered Trademark, Registration No. 1790210, of ILOG, Inc.

To determine each candidate allocation CA, the bids 22 of the corresponding bid vector 24 are input into the optimizing routine along with the first set of exchange objectives and the first set of exchange constraints in a manner well known in the art. The optimizing routine is then executed and the corresponding candidate allocation CA is generated. For example, the bids 22 of bid vector 24-1 are input into the optimizing routine along with the first set of exchange objectives 28 and the first set of exchange constraints 30. The optimizing routine processes these inputs to produce as its output candidate allocation CA1.

Typical exchange objectives include, without limitation, maximizing or minimizing the allocation value in a forward auction or reverse auction, respectively, maximizing or minimizing the number of items traded, maximizing or minimizing the number of winners overall and/or maximizing or minimizing the number of winners in a geographic region. Typical exchange constraints, or rules, include, without limitation, a maximum number of winners constraint, a capacity constraint, e.g., a minimum capacity a bidder supplying an item must have in order to ensure the bidder can supply adequate quantities of the item, a mixture constraint that enables a mixing of an attribute of interest, e.g., weight, to achieve a desired goal, such as, a desired average weight, and minimum or maximum percentage allocation to a particular bidder or group of bidders to ensure said bidder or group of bidders is allocated a predetermined percentage. This listing of typical exchange objectives and typical exchange constraints, however, is not to be construed as limiting the present invention.

As shown in FIG. 5, at least one candidate allocation CA is determined from the bids 22 associated with each bid vector 24. However, in some instances, two or more candidate allocations CA, e.g., CA7 and CA8, can be determined from the same bid vector 24 subject to the first set of exchange objectives 28 and the first set of exchange constraints 30. For example, in FIG. 5, candidate allocations CA7 and CA8 can be determined from the bids 22 of bid vector 24-7 subject to the first set of exchange objectives 28 and the first set of exchange constraints 30. This might occur where candidate allocations CA7 and CA8 both have the same value that optimizes a maximum or minimum value objective and the same number of winners that satisfies a maximum or minimum winner constraint. This might also occur where candidate allocation CA7 is determined for a first set of exchange objectives 28 and a first set of exchange constraints 30 and candidate allocation CA8 is determined for one or more of a modified first set of exchange objectives or a modified first set of exchange constraints.

Figure 6:
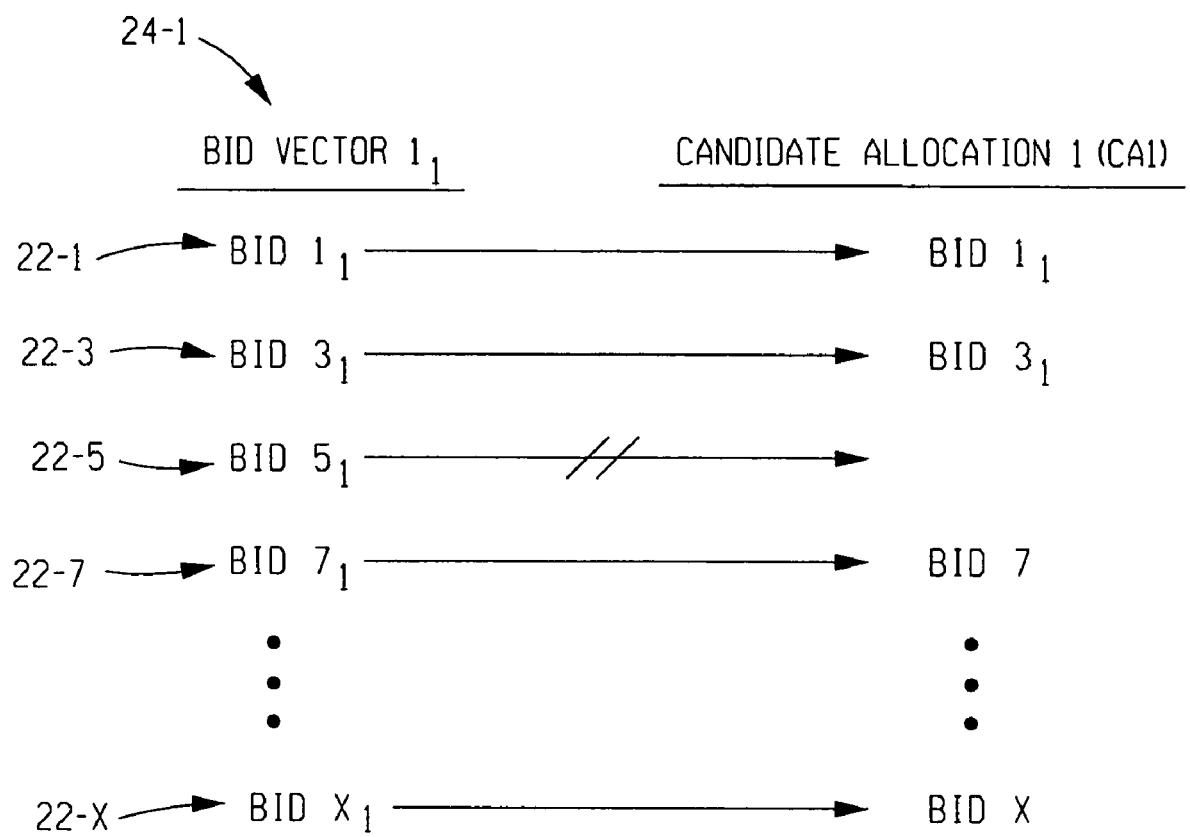
FIG. 6 illustrates an exemplary candidate allocation of the bids of one of the bid vectors of the first subset of bid vectors shown in FIG. 5.

With reference to FIG. 6 and with continuing reference to FIGS. 4 and 5, candidate allocation CA1 determined from bid vector 24-1 can include bids 22-1, 22-3, 22-7 . . . and 22-$x$, and can exclude bid 22-5. In a similar manner the bids of bid vectors 24-3, 24-5, 24-7, 24-(x−2) and 24-x are assigned to one or more candidate allocations CAs subject to the first set of exchange objectives 28 and the first set of exchange constraints 30. It is to be appreciated that the assignment of the bids 22 of each bid vector 24 occurs independently of the assignment of the bids of each other bid vector.

Figure 7:
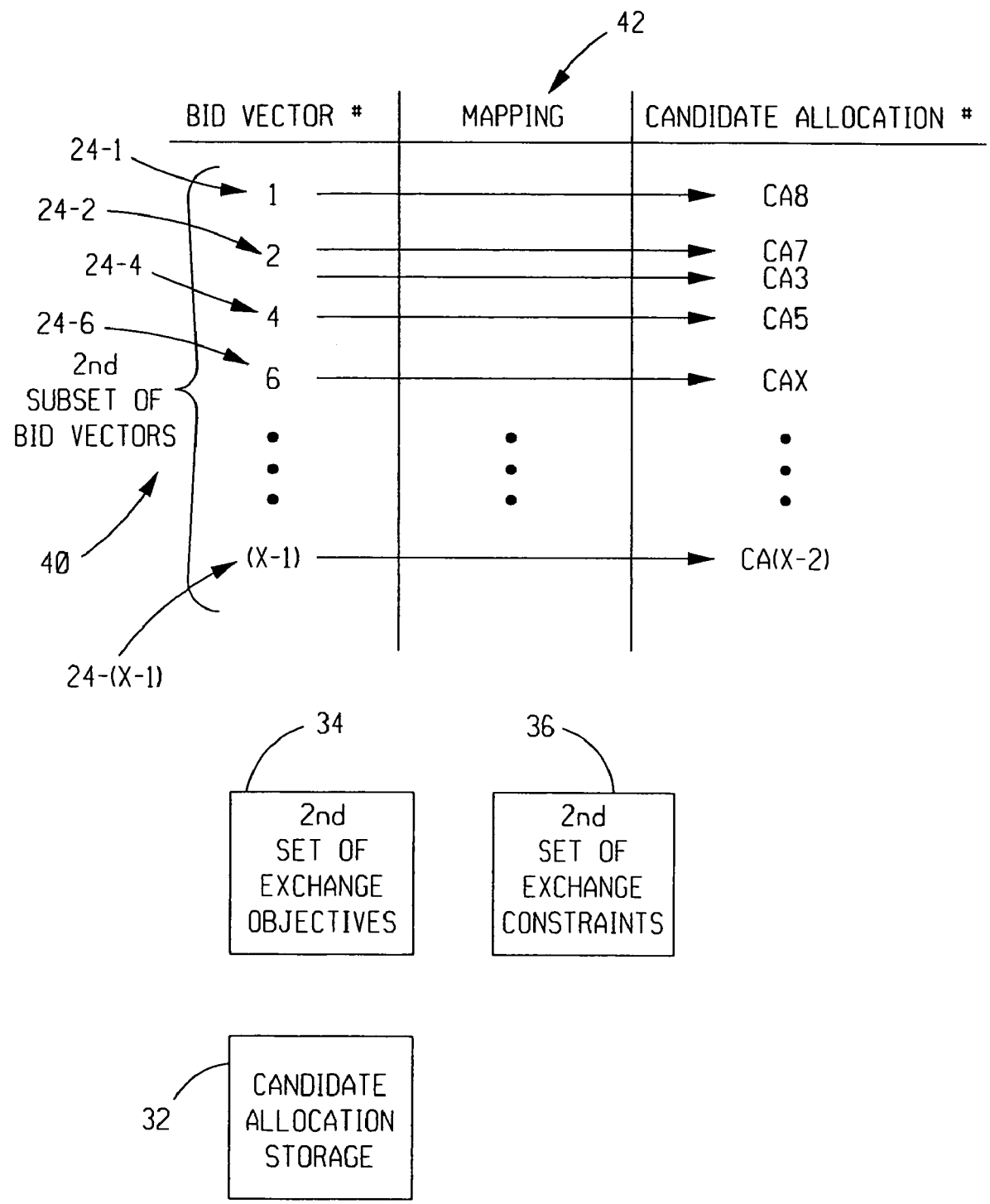
FIG. 7 illustrates a mapping between bid vectors of a second subset of the bid vectors of FIG. 4 and one or more candidate allocations determined from the bid vectors of the first subset of bid vectors shown in FIG. 5 subject to a second set of auction objectives and a second set of auction constraints.

With reference to FIG. 7 and with continuing reference to FIGS. 1-6, candidate allocations CA1-CAX can be stored in a candidate allocation storage 32 of storage 6 of computer 2 for use in a manner to be described hereinafter.

Next, a second set of exchange objectives 34 and a second set of exchange constraints 36 are defined. The exchange objectives of the first and second sets of exchange objectives 28 and 34 can be the same or different. However, the second set of exchange constraints 36 desirably includes additional constraints not found in the first set of exchange constraints 30. Specifically, the second set of exchange constraints 36 desirably includes at least one participation constraint and/or one truth-promotion constraint in addition to whatever constraints the second set of exchange constraints 36 has in common with the first set of exchange constraints 30. Non-limiting examples of participation constraints include (1) requiring the bidder of a bid included in the final allocation of a forward auction not to pay more than the price the bidder included in said bid, (2) requiring the bidder of a bid included in the final allocation of a reverse auction not to be paid less than the price the bidder included in said bid, (3) requiring the bidder of a bid included in the final allocation not to be awarded less than the quantity of at least one item the bidder included in said bid, and/or (4) requiring the bidder of a bid included in the final allocation not to be awarded more than the quantity of at least one item the bidder included in said bid. This listing of exemplary participation constraints, however, is not to be construed as limiting the invention since the use of additional and/or different participation constraints is envisioned.

A non-limiting example of a truth-promotion constraint requires the bidder of a bid that includes a price that does not reflect the bidder's valuation not to be better off in the final allocation than if said bid included a price that reflects the bidder's true valuation. This exemplary truth-promotion constraint, however, is not to be construed as limiting the invention since the use of additional and/or a different truth-promotion constraints is envisioned.

The above described truth-promotion constraint can be instantiated by one of the following equations.

$$v(B(\text{truth}))-\text{pay}(\text{truth}) \geq v(B(\text{lie}))-\text{pay}(\text{lie}), \text{ in a forward auction;}$$

or $$v(B(\text{truth}))-\text{pay}(\text{truth}) \leq v(B(\text{lie}))-\text{pay}(\text{lie}), \text{ in a reverse auction;}$$

where v(B(truth))=the value (v) of a bundle (B) of at least one item and its associated quantity awarded to the bidder when he is bidding his true valuation;

pay(truth)=the value the bidder pays or is paid if he is bidding truthfully in a forward auction or a reverse auction, respectively;

v(B(lie))=the value (v) of a bundle (B) of at least one item and its associated quantity awarded to the bidder when he is not bidding his true valuation; and pay(lie)=the value the bidder pays or is paid if he is not bidding truthfully in a forward auction or a reverse auction, respectively.

In one exemplary embodiment, except for participation constraints and truth-promotion constraints, the first and second sets of exchange constraints 30 and 36 are the same. However, this is not to be construed as limiting the invention.

With continuing reference to FIG. 7, a second subset of bid vectors 40 is defined from the bid vectors 24 shown in FIG. 4. Each of the first and second subsets of bid vectors 26 and 40 can include all or less than all of the bid vectors 24 formed from the first set of bids 20. The first and second subsets of bid vectors 26 and 40 can be different. However, the second subset of bid vectors 40 can include bid vectors 24 in common with the first subset of bid vectors 26, as can be seen by comparing the first and second subsets of bid vectors 26 and 40 in FIGS. 5 and 7, respectively. However, this is not to be construed as limiting the invention.

Figure 8:
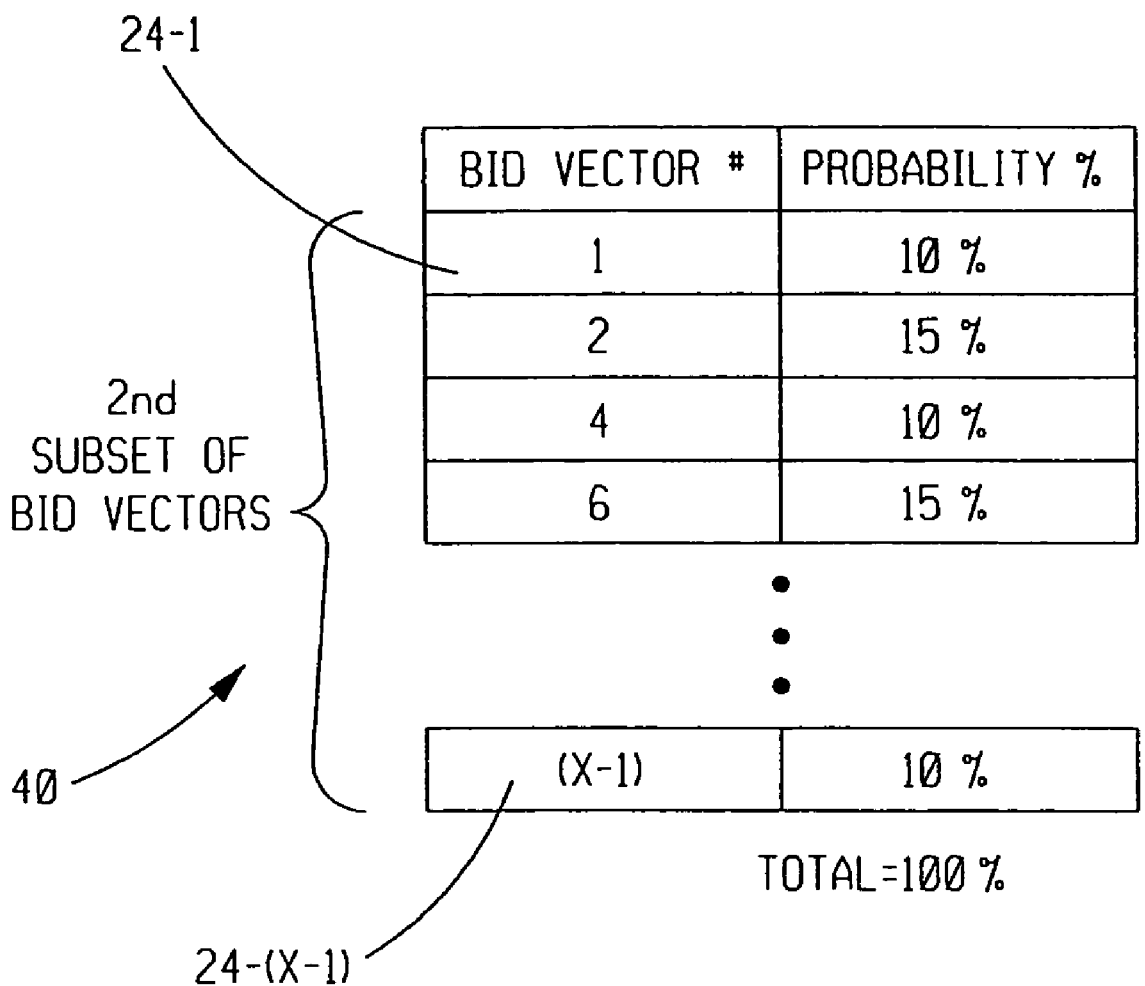
FIG. 8 is a graph of the probability percentage values associated with the bid vectors of the second subset of bid vectors shown in FIG. 7.

With reference to FIG. 8 and with continuing reference to FIGS. 1-7, a probability value is associated with each bid vector 24 of the second subset of bid vectors 40. Each probability value represents how likely the bids 22 of the corresponding bid vector will comprise the bids from which a final allocation (discussed hereinafter) is determined. Desirably, the probability value associated with each bid vector is expressed as a percent probability, with the sum of the probabilities of the bid vectors comprising the second subset of bid vectors totaling 100%. Desirably, the percent probability associated with each bid vector is determined empirically. However, this is not to be construed as limiting the invention.

The optimizing routine described above can be utilized to determine a mapping 42, shown best in FIG. 7, between each bid vector 24 of the second subset of bid vectors 40 and at least one candidate allocation CA stored in the candidate allocation storage 32. Specifically, the second subset of bid vectors 40, the probability value associated with each bid vector 24 of the second subset of bid vectors 40, the second set of exchange objectives 34, the second set of exchange constraints 36, and the candidate allocations CA stored in candidate allocation storage 32 are input into the optimizing routine. Based on these inputs, the optimizing routine determines a mapping 42 between each bid vector 24 of the second subset of bid vectors 40 and at least one candidate allocation CA determined for each bid vector 24 of the first subset of bid vectors 26. Essentially, this mapping 42 represents a desirable fit between each bid vector 24 of the second subset of bid vectors 40 and at least one candidate allocation CA determined for each bid vector 24 of the first subset of bid vectors 26. In connection with mapping 42, it is not necessary that each candidate allocation CA stored in the candidate allocation storage 32 be utilized. Moreover, one or more bid vectors 24 of the second subset of bid vectors 40 can be mapped to the same candidate allocation CA.

Figure 9:
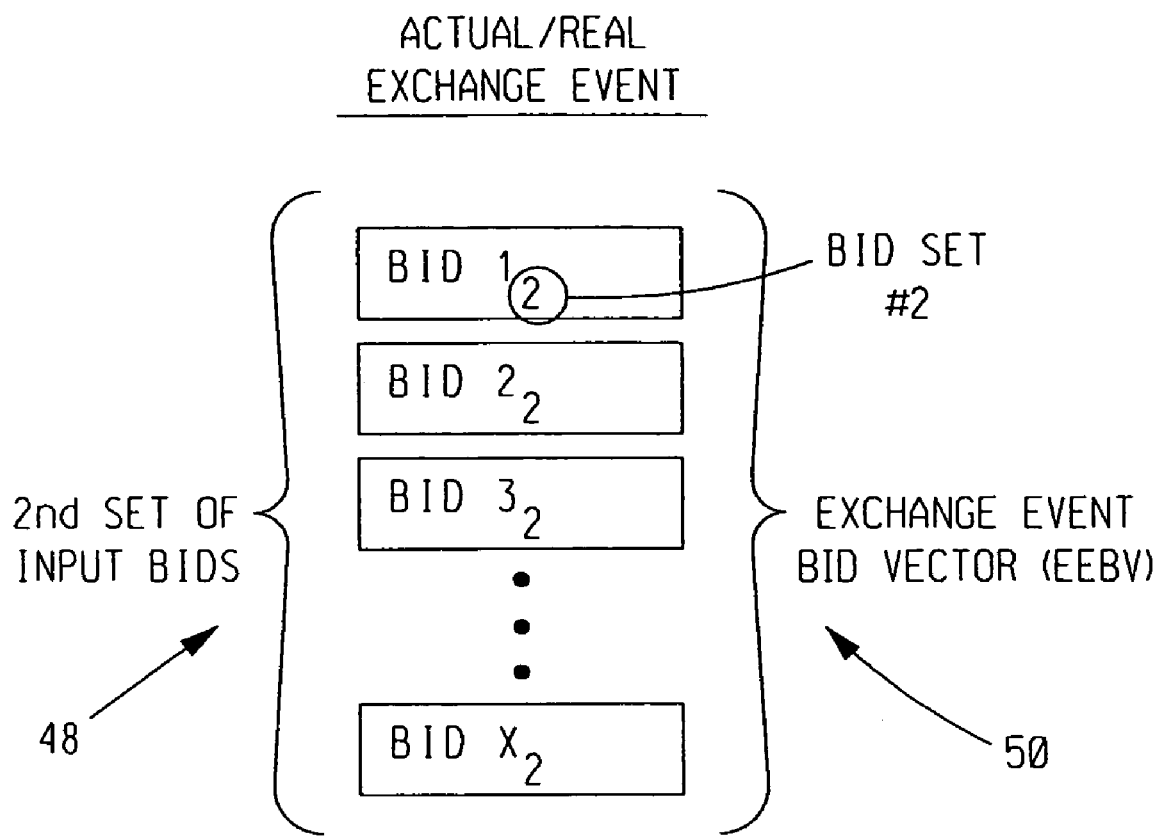
FIG. 9 illustrates a second set of input bids that define an auction event bid vector (EEBV)

With reference to FIG. 9 and with continuing reference to FIGS. 1-8, at an appropriate time after mapping 42 is complete, an actual exchange event can be conducted. In the actual exchange event, a second set of bids 48 that define an Exchange Event Bid Vector (EEBV) 50 is input into or received by computer 2. Each bid of the second set of bids 48 includes at least one item, a quantity for each item, and a price for all of the item(s) and their quantities.

Figure 10:
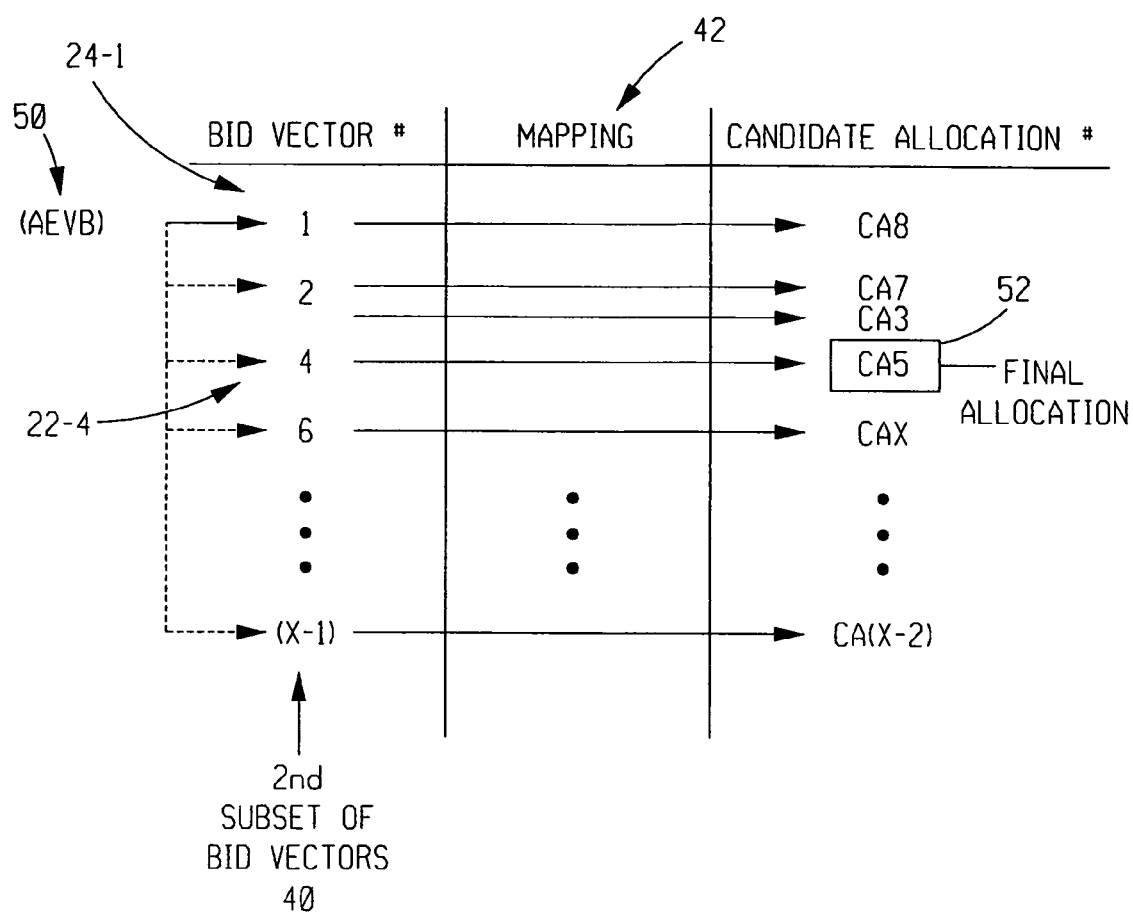
FIG. 10 illustrates the comparison of EEBV in FIG. 9 to each bid vector of the second subset of bid vectors shown in FIG. 7 in order to determine the candidate allocation of FIG. 7 that will be designated as a final allocation.

With reference to FIG. 10 and with continuing reference to FIGS. 1-9, computer 2 compares EEBV 50 to each bid vector 24 of the second subset of bid vectors 40. This comparison includes comparing the items, the quantity of each item, and the price of each bid of EEBV 50 to the items, the quantity of each item, and the price of each bid of each bid vector 24 of the second subset of bid vectors 40.

The candidate allocation CA of the bid vector 24 of the second subset of bid vectors 40 having the item(s), the quantity of each item, and the price of the bids thereof that most closely match (subject to one or more restrictions, such as no bid price of the EEBV 50 exceeds (in a reverse auction) or is exceeded by (in a forward auction) the bid price of a candidate allocation CA) the item(s), the quantity of each item and the price of the bids of EEBV 50 is selected as the final allocation 52. For example, EEBV 50 is compared to each bid vector 24 of the second subset of bid vectors 40 as shown in FIG. 10. If, based on this comparison, computer 2 determines that the bids of bid vector 22-4 most closely match the bids of EEBV 50, the candidate allocation associated with bid vector 22-4, in this case candidate allocation CA5, is designated as the final allocation 52. Computer 2 can output final allocation 52 to any desirable and/or appropriate participant in the actual exchange event, e.g., one or more bidders, one or more bid takers, and/or the event manager.

Final allocation 52 includes the quantity of each item allocated to each bidder having a bid included in EEBV 50 and the price said bidder pays in a forward auction or is paid in a reverse auction. In a forward auction, the price each bidder pays for all of his bids included in final allocation 52 is less than or equal to the price bid for all of his bids included in EEBV 50. In a reverse auction, the price each bidder is paid for all of his bids included in final allocation 52 is greater than or equal to the price bid for all of his bids included in EEBV 50.

As discussed above, mapping 42 maps each bid vector 24 of the second subset of bid vectors 40 to at least one predetermined candidate allocation CA in a manner whereupon said mapping 42 satisfies the second set of exchange objectives 34 and the second set of exchange constraints 36. Prior to using mapping 42 with an actual exchange event, mapping 42 can be evaluated to determine if it meets certain objective and/or subjective criteria. If not, the process of determining a mapping from each bid vector 24 of the second subset of bid vectors 40 to at least one candidate allocation CA can be repeated as many times as is deemed necessary, with a different second set of exchange objectives 34 and/or a different second set of exchange constraints 36 each time, until a desired mapping 42 is determined that satisfies all of the objective and/or subjective criteria. Desirably, these criteria are determined by an event manager who controls the generation of mapping 42 as well as the conduct of the exchange event. However, this is not to be construed as limiting the invention.

A first exemplary coding of inputs to the optimizing routine for determining mapping 42 for an exemplary forward auction where two bidders are bidding on a single item is shown next.

Auction Setup Conditions:
General Setup Conditions:
Number of bidders: 2
Number of allocations: 2
(namely, allocation 1—bidder 1 gets the item; allocation 2—bidder 2 gets the item)
Auction Objective: maximize value
Participation Constraint: strong
Truth Promotion Constraint: strong
Randomization allowed?: No
Payments allowed?: Yes
Are payments required to effect certain outcome(s)?: No
Bidder 1 Setup Conditions:
Number of bids for bidder 1: 2 (namely, bid 1 or bid 2)
Probability of bid 1 for bidder 1: 0.5
(The probability value of a bid vector is the product (multiplication) of all the probability values of the bids of the bid vector)
Probability of bid 2 for bidder 1: 0.5
Utility of allocation 1 to bidder 1 when his truthful bid is bid 1=2
(first value to bidder 1 if he gets the item);
Utility of allocation 1 to bidder 1 when his truthful bid is bid 2=4
(second value to bidder 1 if he gets the item); and
Utility of allocation 2 to bidder 1 when his truthful bid is bid 1 or bid 2=0 (since for allocation 2 to bidder 1, bidder 1 does not get the item).
Bidder 2 Setup Conditions:
Number of bids for bidder 2: 2 (namely, bid 1 or bid 2)
Probability of bid 1 for bidder 2: 0.6
Probability of bid 2 for bidder 2: 0.4
Utility of allocation 2 to bidder 2 when his truthful bid is bid 1=3
(first value to bidder 2 if he gets the item);
Utility of allocation 2 to bidder 2 when his truthful bid is bid 2=4
(second value to bidder 2 if he gets the item); and
Utility of allocation 1 to bidder 2 when his truthful bid is bid 1 or bid 2=0. (since for allocation 1 to bidder 2, bidder 2 does not get the item).
Bounds: (ranges of values the following payment variables can take on)
$-\inf \leq pi\_1\_1\_1 \leq +\inf$
$-\inf \leq pi\_1\_1\_2 \leq +\inf$
$-\inf \leq pi\_2\_1\_1 \leq +\inf$
$-\inf \leq pi\_2\_1\_2 \leq +\inf$
$-\inf \leq pi\_1\_2\_1 \leq +\inf$
$-\inf \leq pi\_1\_2\_2 \leq +\inf$
$-\inf \leq pi\_2\_2\_1 \leq +\inf$
$-\inf \leq pi\_2\_2\_2 \leq +\inf$
where $\inf = \infty$
Binaries: (limits each of the following allocation variables to a binary value of 0 or 1)
p_t_1_1_o1
p_t_1_1_o2
p_t_2_1_o1
p_t_2_1_o2
p_t_1_2_o1
p_t_1_2_o2
p_t_2_2_o1
p_t_2_2_o2.
Auction Objective:
Maximize 0.3pi_1_1_1+0.3pi_1_1_2+0.3pi_2_1_1+0.3pi_2_1_2+0.2pi_1_2_1+0.2pi_1_2_2+0.2pi_2_2_1+0.2pi_2_2_2
Auction Constraints:
Probability Constraints: (each must=1 (or 100%))
1. p_t_1_1_o1+p_t_1_1_o2=1
2. p_t_2_1_o1+p_t_2_1_o2=1
3. p_t_1_2_o1+p_t_1_2_o2=1
4. p_t_2_2_o1+p_t_2_2_o2=1
Strong Participation Constraints: (force bidders utility to be $\geq 0$)
1. 2p_t_1_1_o1+0p_t_1_1_o2−pi_1_1_1$\geq$0
2. 0p_t_1_1_o1+3p_t_1_1_o2−pi_1_1_2$\geq$0
3. 4p_t_2_1_o1+0p_t_2_1_o2−pi_2_1_1$\geq$0
4. 0p_t_2_1_o1+3p_t_2_1_o2−pi_2_1_2$\geq$0
5. 2p_t_1_2_o1+0p_t_1_2_o2−pi_1_2_1$\geq$0
6. 0p_t_1_2_o1+4p_t_1_2_o2−pi_1_2_2$\geq$0
7. 4p_t_2_2_o1+0p_t_2_2_o2−pi_2_2_1$\geq$0
8. 0p_t_2_2_o1+4p_t_2_2_o2−pi_2_2_2$\geq$0
Strong Truth-Promotion Constraints:
1. 2p_t_1_1_o1+0p_t_1_1_o2−pi_1_1_1−2p_t_2_1_o1−0p_t_2_1_o2+pi_2_1_1$\geq$0

2. $0p\_t\_1\_1\_o1+3p\_t\_1\_1\_o2-pi\_1\_1\_2-0p\_t\_1\_2\_o1-3p\_t\_1\_2\_o2+pi\_1\_2\_2 \div 0$
3. $4p\_t\_2\_1\_o1+0p\_t\_2\_1\_o2-pi\_2\_1\_1-4p\_t\_1\_1\_o1-0p\_t\_1\_1\_o2+pi\_1\_1\_1 \geqq 0$
4. $0p\_t\_2\_1\_o1+3p\_t\_2\_1\_o2-pi\_2\_1\_2-0p\_t\_2\_2\_o1-3p\_t\_2\_2\_o2+pi\_2\_2\_2 \geqq 0$
5. $2p\_t\_1\_2\_o1+0p\_t\_1\_2\_o2-pi\_1\_2\_1-2p\_t\_2\_2\_o1-0p\_t\_2\_2\_o2+pi\_2\_2\_1 \geqq 0$
6. $0p\_t\_1\_2\_o1+4p\_t\_1\_2\_o2-pi\_1\_2\_2-0p\_t\_1\_1\_o1-4p\_t\_1\_1\_o2+pi\_1\_1\_2 \geqq 0$
7. $4p\_t\_2\_2\_o1+0p\_t\_2\_2\_o2-pi\_2\_2\_1-4p\_t\_1\_2\_o1-0p\_t\_1\_2\_o2+pi\_1\_2\_1 \geqq 0$
8. $0p\_t\_2\_2\_o1+4p\_t\_2\_2\_o2-pi\_2\_2\_2-0p\_t\_2\_1\_o1-4p\_t\_2\_1\_o2+pi\_2\_1\_2 \geqq 0$ where, for each allocation variable p_t_x_y_z1 and each payment variable pi_x_y_z2, x=bidder 1's bid number;
y=bidder 2's bid number;
z1=winning allocation (namely, allocation 1 or 2); and
z2=winning bidder (namely, bidder 1 or 2).

Utilizing the foregoing inputs to the optimizing routine, a suitable mapping, like mapping 42, can be found for a simple two player-two outcome forward auction. As can be appreciated from the foregoing, increasing the number of bidders and/or items in the forward auction increases the complexity of the coding, especially the coding of the strong participation constraint(s) and the strong truth-promotion constraint(s), required to determine the corresponding mapping.

In the foregoing Auction Setup Conditions, the word "Utility" is utilized in connection with each allocation to each bidder. In a forward auction, utility is the value the corresponding bidder believes the items of the bid are worth minus the price the bidder pays for the bid. In contrast, in a reverse auction, utility is the price the bidder is paid for the bid minus the value the bidder believes the bid is worth.

In the absence of an actual bid that includes the item(s) which is/are the subject of the exemplary forward auction, the utility for each allocation to each bidder can be determined empirically based upon, without limitation, prior bidding patterns of the bidder in other exchanges, from data obtained from the bidder or in any other suitable and desirable manner.

In the first exemplary coding, the Participation Constraints and the Truth-Promotion Constraints are denoted as being "Strong". As used herein, a strong constraint is one that is formulated based on each bidder represented by the constraint possibly knowing the bids of the other bidders. Hence, the strong constraints are strong in the sense that each bidder may know the bids of the other bidders and will be better off (from a utility standpoint) participating in the auction (a specific type of exchange) than not participating in the auction and will be better off bidding truthfully than bidding untruthfully. Stated another way, the strong constraints are strong in the sense that the bidder gets higher utility from participating than not, regardless of how others bid; and is better off bidding truthfully, regardless of how others bid.

In the foregoing first exemplary coding, each strong participation constraint forces the utility of the bidders represented by the strong participation constraint to be greater than or equal to "0". However, this is not to be construed as limiting the invention since the utility of the bidders represented by each strong participation constraint can be greater than (>), equal to (=) and/or less than (<) any suitable or desirable value, for example, without limitation, −1, −0.5, 0.25, 1, 2, 2.15, 3, etc. For the purpose of describing the present invention, the utility of the bidders represented by each strong participation constraint will be described as being greater than or equal to 0. For example, the first strong participation constraint shown above has the constant "2" associated with a first allocation variable p_t_1_1_o1 and a value of "0" associated with a second allocation variable p_t_1_1_o2. The constant "2" associated with the first allocation variable is the value that bidder 1, i.e., the bidder associated with allocation or outcome 1 (o1), believes the item(s) of his bid is/are worth given bid 1 is his truthful bid and this value is combined (multiplied) with the first allocation variable, which is assigned a value of 1 or 0 by the optimizing software. The constant "0" associated with the second allocation variable is combined (multiplied) with the value assigned to the second allocation variable by the optimizing software and, therefore, always equals 0. The first strong participation constraint also includes a payment variable pi_1_1_1 for the price bidder 1 pays. In the foregoing example of the first strong participation constraint, the last number of the payment variable identifies the bidder who pays, in this case bidder 1. Thus, the first strong participation constraint essentially requires the value bidder 1 believes his bid is worth, i.e., 2, to be greater than or equal to the price the winning bidder, i.e., bidder 1, would pay. Thus, the first strong participation constraint forces bidder's 1 utility to be greater than or equal to 0. In a similar manner, it can be determined that the other strong participation constraints force the utility of bidder 1 and bidder 2 to be greater than or equal to 0 for all combinations of bid vectors and allocations listed in the auction setup conditions, namely, allocation 1—bidder 1 gets the item; allocation 2—bidder 2 gets the item.

Referring now to the Strong Truth-Promotion Constraints of the first exemplary coding, each strong truth-promotion constraint essentially forces the utility of a bidder bidding truthfully to be greater than his utility if he bids falsely, i.e., the utility of each strong truth-promotion constraint of the first exemplary coding is greater than or equal to "0". However, this is not to be construed as limiting the invention since the utility of the bidders represented by each strong truth-promotion constraint can be greater than (>), equal to (=) and/or less than (<) any suitable or desirable value, for example, without limitation, −1, −0.5, 0.25, 1, 2, 2.15, 3, etc. For the purpose of describing the present invention, the utility of the bidders represented by each strong truth-promotion constraint will be described as being greater than or equal to 0. The first triplet of terms of the first strong truth-promotion constraint is a copy of the first strong participation constraint. The last triplet of terms of the first strong participation constraint is essentially a copy of the first strong participation constraint with one change, namely, bidder 1 is bidding his bid 2 instead of his bid 1. The last triplet of terms of the first strong participation constraint is subtracted from the first triplet of terms of the first strong truth promotion constraint.

The term 2p_t_1_1_o1 of the first strong truth-promotion constraint essentially codifies the idea that if bidder 1's truthful bid is his bid 1 and if bidder 1 bids his bid 1, bidder 1 will be deemed the winning bidder, i.e., outcome 1 (o1), when bidder 2 bids his bid 1. Similarly, the term 2p_t_2_1_o1 of the first strong truth-promotion constraint essentially codifies the idea that if bidder 1's truthful bid is bid 2 and if bidder 1 bids his bid 2, then bidder 1 will be deemed the winning bidder when bidder 2 bids his bid 1. In the above example, the optimizing software assigns a value of 0 (false) or 1 (true) to each allocation variable of the form p_t_x_y_z, and assigns to each payment variable of the form pi_x_y_z the price bidder (z) pays.

The foregoing description of the first strong truth-promotion constraint is applicable to the other strong truth-promotion constraints shown above.

Figure 11A:
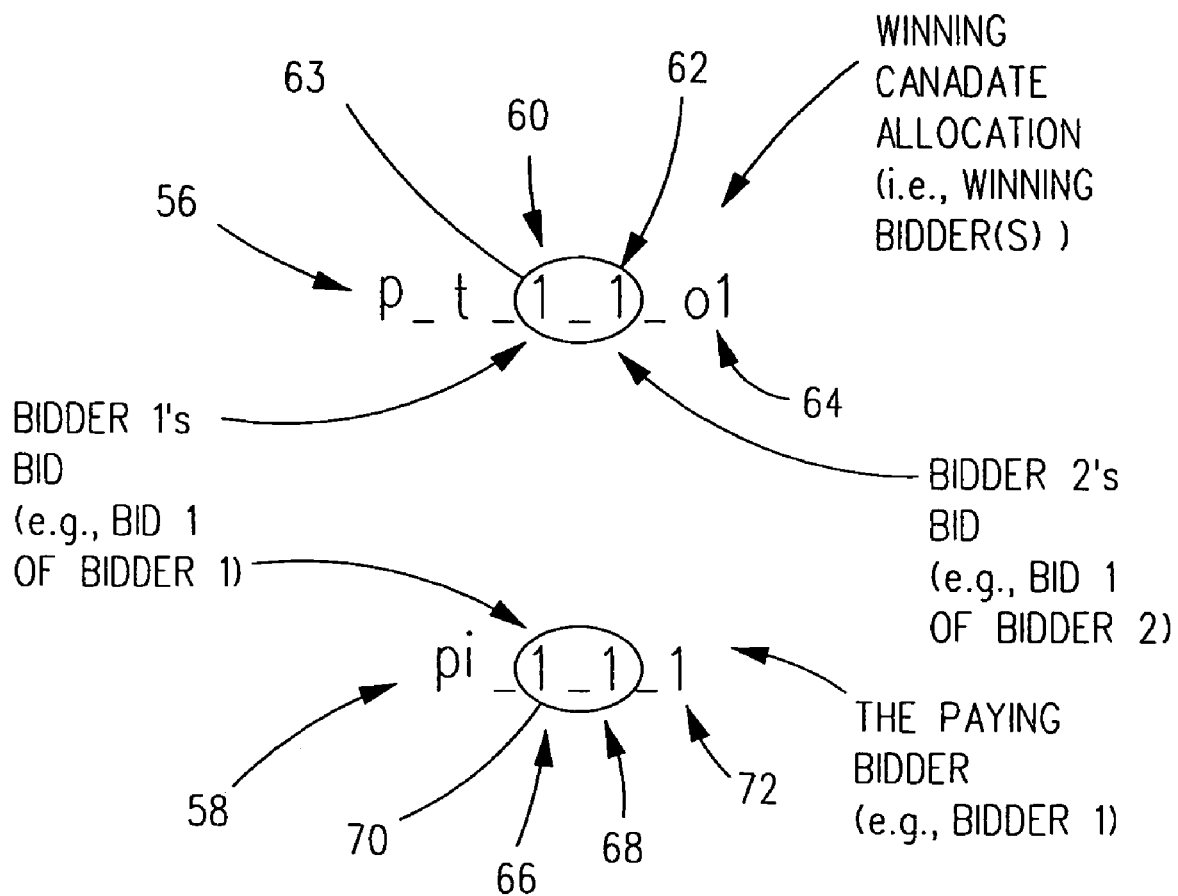
FIG. 11A illustrates an exemplary allocation variable and an exemplary payment variable utilized in connection with an exemplary coding of inputs to an optimizing routine for determining a mapping between bid vectors and candidate allocations.

The optimizing routine processes the first exemplary coding of inputs to determine appropriate values for all the variables thereof. Utilizing the thus determined values, an appropriate mapping 42 can be generated. An example of a mapping 42 between variables appearing in the strong constraints discussed above and a candidate allocation will now be described with reference to FIGS. 11A and 11B. The following discussion assumes that candidate allocations CAs have been previously determined.

In the first exemplary coding described above, each constraint is comprised of two or more allocation variables 56. In addition, each strong participation constraint and each strong truth-promotion constraint is further comprised of a quantity of one and two payment variables 58, respectively. Each allocation variable 56 includes a field 60 for bidder 1's bid and a field 62 for bidder 2's bid. The bids included in fields 60 and 62 comprise the bid vector 63 represented by the allocation variable 56. Each allocation variable 56 also includes a field 64 that includes one of the candidate allocations, or outcomes, that were determined heretofore, namely, allocation or outcome 1 (o1) where bidder 1 gets the item or allocation or outcome 2 (o2) where bidder 2 gets the item. A careful evaluation of the strong constraints of the first exemplary coding reveals that the allocation variables defined in the first exemplary coding account for all combinations of bid vectors 63 and candidate allocations 64 for the one item of the exemplary forward auction. (Recall, that in the above first exemplary coding, each of the two bidders has a choice of two bids, each of which represents a different utility the bidder may have for the item.)

Each payment variable 58 includes fields 66 and 68 which represent bidder 1's bid and bidder 2's bid, respectively. The bids included in fields 66 and 68 comprise the bid vector 70 represented by payment variable 58. Lastly, each payment variable 58 includes a field 72 that includes an indication of which bidder is paying. As can be seen, the first exemplary coding includes a payment variable 58 for each possible combination of bid vectors and paying bidders.

Given the foregoing description of allocation variables 56 and payment variables 58, along with the first exemplary coding described above, it is believed that one of ordinary skill in the art could readily generate suitable strong constraints for any number of bidders, each of which has any number of bids, and any number of allocations.

In the Auction Objective of the first exemplary coding, each payment variable is multiplied by a constant. The constant associated with each payment variable is the product of the probabilities associated with the bids represented by the payment variable for each bidder. Thus, for example, payment variable pi__1__1__1 is multiplied by 0.3, which is the probability of bid 1 for bidder 1 (0.5—from the Bidder 1 Setup Conditions) multiplied by the probability of bid 1 for bidder 2 (0.6—from the Bidder 2 Setup Conditions). The constant associated with each payment variable is a probability value that represents how likely the bids of the bid vector represented by the payment variable will comprise the bids from which a final allocation is determined.

Figure 11B:
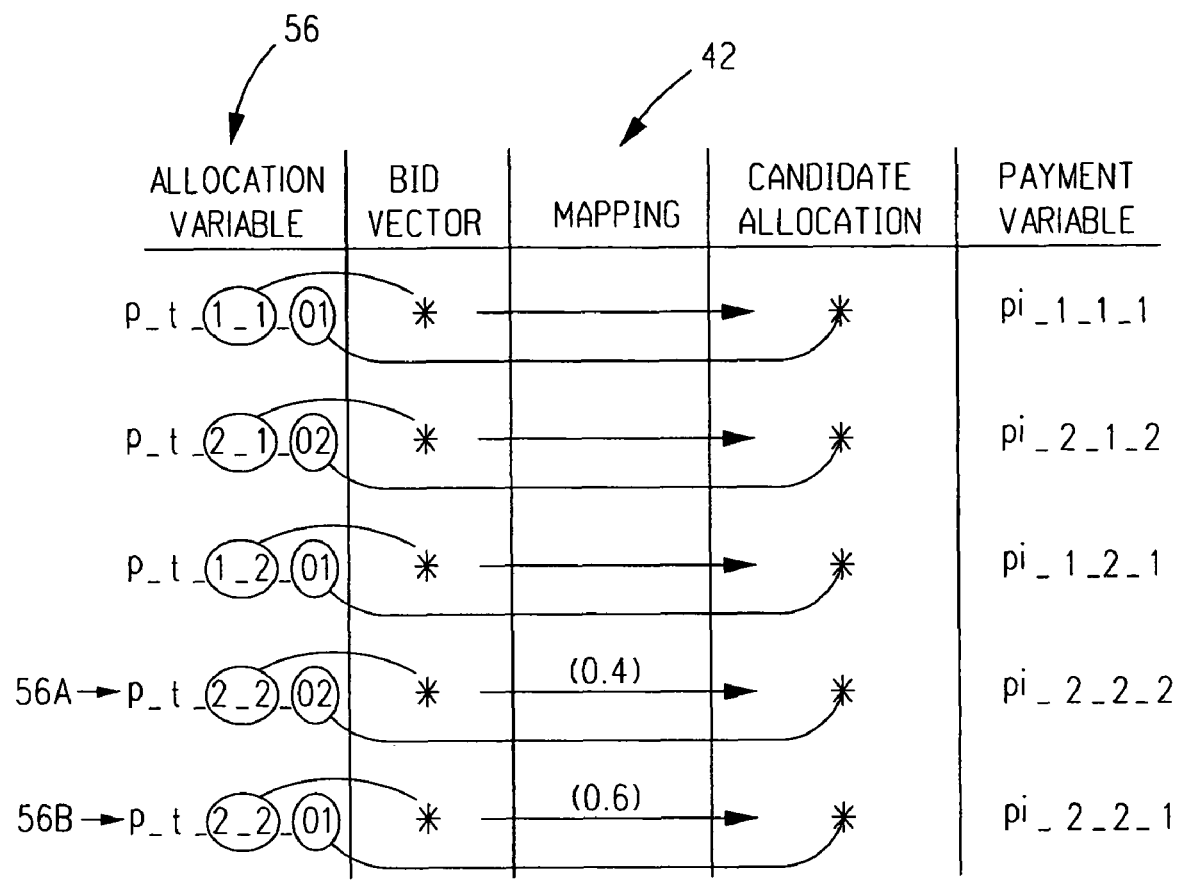
FIG. 11B illustrates a mapping between bid vectors and candidate allocations of an exemplary auction.

If, as a result of optimization, the optimizing software assigns a value of 1 to an allocation variable 56, a mapping is defined between the bid vector represented by the allocation variable and the candidate allocation represented by said allocation variable. Exemplary mappings for allocation variables 56 of the first exemplary coding are shown in FIG. 11B. In contrast, where the optimizing software assigns a value of 0 to an allocation variable 56 no mapping exists between the bid vector and the candidate allocation represented by this allocation variable.

FIG. 11B shows that each allocation variable assigned a value of 1 by the optimizing software represents a mapping between the bid vector represented by the allocation variable and the candidate allocation represented by the allocation variable. Hence, the optimizing software assigning a value of 1 to an allocation variable essentially confirms that a mapping exists between the bid vector and the candidate allocation represented by said allocation variable. In contrast, each allocation variable assigned a value of 0 by the optimizing software indicates that no mapping exists between the bid vector and the candidate allocation represented by said allocation variable. The value assigned by the optimizing software to each payment variable 58 associated with an allocation variable assigned a value of 1 is the payment to be made by the bidder included in field 72 of the payment variable if the bid vector of the associated allocation variable is selected as the final allocation 52.

The example of mapping 42 shown in FIG. 11B assumes that a value of 1 is assigned to each of the first three allocation variables shown therein. However, if the setup condition for each allocation variable permits the allocation variable to take on a value between 0 and 1, inclusive, and if the optimizing software assigns a value between 0 and 1, exclusive, to an allocation variable, this value is used as a weighting value for determining how often the corresponding mapping should be deemed to be the final allocation 52. For example, suppose in FIG. 11B that allocation variables 56A and 56B, both related to bid vector 2__2 but to different candidate allocations, are assigned values of 0.4 and 0.6, respectively, by the optimizing software. If, during the determination of the final allocation 52, a choice can be made between the candidate allocation and the payment associated with the payment variable of allocation variable 56A or the candidate allocation and payment associated with the payment variable of allocation variable 56B, a weighted selection is made between the candidate allocation associated with allocation variable 56A and the candidate allocation associated with allocation variable 56B based upon the values of the corresponding allocation variables. Thus, in this example, the candidate allocation associated with allocation variable 56A will be selected 40% of the time while the candidate allocation associated with allocation variable 56B will be selected 60% of the time.

A second exemplary coding of inputs to the optimizing routine for determining mapping 42 for an exemplary forward auction where two bidders are bidding on a single item is shown next.

Auction Setup Conditions:
General Setup Conditions: Same as First Exemplary Coding Described Above Except:
Participation Constraint: weak; and
Truth Promotion Constraint: weak
Bidder 1 Setup Conditions: Same as First Exemplary Coding Described Above
Bidder 2 Setup Conditions: Same as First Exemplary Coding Described Above
Bounds: Same as First Exemplary Coding Described Above
Binaries: Same as First Exemplary Coding Described Above
Auction Objective: Same as First Exemplary Coding Described Above
Auction Constraints:
Probability Constraints: Same as First Exemplary Coding Described Above
Weak Participation Constraints: (force bidder's utility to be $\geq 0$)

1. $1.2p\_t\_1\_1\_o1+0p\_t\_1\_1\_o2-0.6pi\_1\_1\_1+ 0.8p\_t\_1\_2\_o1+0p\_t\_1\_2\_o2-0.4pi\_1\_2\_1 \geqq 0$
2. $2.4p\_t\_2\_1\_o1+0p\_t\_2\_1\_o2-0.6pi\_2\_1\_1+ 1.6p\_t\_2\_2\_o1+0p\_t\_2\_2\_o2-0.4pi\_2\_2\_1 \geqq 0$
3. $0p\_t\_1\_1\_o1+1.5p\_t\_1\_1\_o2-0.5pi\_1\_1\_2+ 0p\_t\_2\_1\_o1+1.5p\_t\_2\_1\_o2-0.5pi\_2\_1\_2 \geqq 0$
4. $0p\_t\_1\_2\_o1+2p\_t\_1\_2\_o2-0.5pi\_1\_2\_2+0p\_t\_2\_2\_o1+2p\_t\_2\_2\_o2-0.5pi\_2\_2\_2 \geqq 0$ Weak Truth-Promotion Constraints:
1. $1.2p\_t\_1\_1\_o1+0p\_t\_1\_1\_o2-0.6pi\_1\_1\_1- 1.2p\_t\_2\_1\_o1-0p\_t\_2\_1\_o2+0.6pi\_2\_1\_1+ 0.8p\_t\_1\_2\_o1+0p\_t\_1\_2\_o2-0.4pi\_1\_2\_1- 0.8p\_t\_2\_2\_o1-0p\_t\_2\_2\_o2+0.4pi\_2\_2\_1 \geqq 0$
2. $2.4p\_t\_2\_1\_o1+0p\_t\_2\_1\_o2-0.6pi\_2\_1\_1- 2.4p\_t\_1\_1\_o1-0p\_t\_1\_1\_o2+0.6pi\_1\_1\_1+ 1.6p\_t\_2\_2\_o1+0p\_t\_2\_2\_o2-0.4pi\_2\_2\_1- 1.6p\_t\_1\_2\_o1-0p\_t\_1\_2\_o2+0.4pi\_1\_2\_1 \geqq 0$
3. $0p\_t\_1\_1\_o1+1.5p\_t\_1\_1\_o2-0.5pi\_1\_1\_2- 0p\_t\_1\_2\_o1-1.5p\_t\_1\_2\_o2+0.5pi\_1\_2\_2+ 0p\_t\_2\_1\_o1+1.5p\_t\_2\_1\_o2-0.5pi\_2\_1\_2- 0p\_t\_2\_2\_o1-1.5p\_t\_2\_2\_o2+0.5pi\_2\_2\_2 \geqq 0$
4. $0p\_t\_1\_2\_o1+2p\_t\_1\_2\_o2-0.5pi\_1\_2\_2-0p\_t\_1\_1\_o1-2p\_t\_1\_1\_o2+0.5pi\_1\_1\_2+0p\_t\_2\_2\_o1+2p\_t\_2\_2\_o2-0.5pi\_2\_2\_2-0p\_t\_2\_1\_o1-2p\_t\_2\_1\_o2+0.5pi\_2\_1\_2 \geqq 0$ where, for each allocation variable $p\_t\_x\_y\_z1$ and each payment variable $pi\_x\_y\_z2$, x=bidder 1's bid number;
y=bidder 2's bid number;
z1=winning allocation (namely, allocation 1 or 2); and
z2=winning bidder (namely, bidder 1 or 2).

Except for the Participation constraints and the Truth-promotion constraints both being "Weak", the Auction Setup Conditions and the Auction Objective of the second exemplary coding are the same as the Auction Setup Conditions and the Auction Objective of the first exemplary coding discussed above. In addition, the Probability Constraints of the second exemplary coding are the same as the Probability Constraints of the first exemplary coding. However, the second exemplary coding includes Participation Constraints and Truth-Promotion Constraints that are denoted as being "Weak" constraints. As used herein, a weak constraint is one that is formulated based on each bidder represented by the constraint not knowing the bids of the other bidders. This is in contrast to the strong constraints discussed above wherein each bidder may know the bids of the other bidders.

The weak constraints are weak in the sense that each bidder does not know the bids of the other bidders. Stated another way, weak constraints are weak in the sense that each bidder gets higher utility from participating than not, in expectation over other bidders' truthful bids; and is better off bidding truthfully in expectation over other bidders' truthful bids. In accordance with the present invention, each weak constraint is essentially a combination of at least two strong constraints. Each weak constraint also represents the range of probable bids that can be made by each bidder of the exchange under the assumption that the bidder will bid in a manner that ensures he is better off (from a utility standpoint) bidding one bid versus bidding another bid.

Like each strong participation constraint, each of the foregoing weak participation constraints is configured to force the utility of the bidders represented by the constraint to be greater than or equal to 0. However, this is not to be construed as limiting the invention since the utility of the bidders represented by each weak participation constraint can be greater than (>), equal to (=) and/or less than (<) any suitable or desirable value, for example, without limitation, −1, −0.5, 0.25, 1, 2, 2.15, 3, etc. For the purpose of describing the present invention, the utility of the bidders represented by each weak participation constraint will be described as being greater than or equal to 0. Similarly, like each strong truth-promotion constraint, each of the foregoing weak truth-promotion constraints is configured to force the utility of each bidder represented thereby to be greater if the bidder bids truthfully than if the bidder bids falsely, i.e., the difference in utilities between truthful and nontruthful bids is greater than or equal to "0". However, this is not to be construed as limiting the invention since the utility of the bidders represented by each weak truth-promotion constraint can be greater than (>), equal to (=) and/or less than (<) any suitable or desirable value, for example, without limitation, −1, −0.5, 0.25, 1, 2, 2.15, 3, etc. For the purpose of describing the present invention, the utility of the bidders represented by each weak truth-promotion constraint will be described as being greater than or equal to 0. The formulation of each weak participation constraint will now be described.

The first triplet of terms of the first weak participation constraint is a copy of the first strong participation constraint, with the constant preceding each expression multiplied by 0.6, i.e., the probability that bidder 2 will bid his bid 1 (See Bidder 2 Setup Conditions). The last triplet of terms of the first participation constraint is a copy of the fifth strong participation constraint, with the constant preceding each expression multiplied by 0.4, i.e., the probability that bidder 2 will bid his bid 2 (See Bidder 2 Setup Condition). Note that the first triplet of terms of the first weak participation constraint assumes that bidders 1 and 2 are bidding their respective bids 1 whereas the last triplet of terms of the first weak participation constraint assumes that bidder 1 is bidding his bid 1 while bidder 2 is bidding his bid 2. The remaining weak participation constraints are formulated in a similar manner to the first weak participation constraint.

Each weak truth-promotion constraint is formulated in a manner similar to each weak participation constraint. For example, the first sextuplet of terms of the first weak truth-promotion constraint is a copy of the first strong truth-promotion constraint while the second sextuplet of terms of the first weak truth-promotion constraint is a copy of the fifth strong truth-promotion constraint. In the first weak truth-promotion constraint, the first and second sextuplets of terms are summed together.

Each of the first sextuplet of terms of the first weak truth-promotion constraint is multiplied by 0.6, i.e., the probability that bidder 2 will bid his bid 1, while each of the second sextuplet of terms of the first weak truth-promotion constraint is multiplied by 0.4, i.e., the probability that bidder 2 will bid his bid 2. The remaining weak truth-promotion constraints are formulated in the same manner as the first weak truth-promotion constraint.

The optimizing routine processes the second exemplary coding of inputs to determine appropriate values for all of the variables thereof. Utilizing the thus determined values, an appropriate mapping 42 can be generated in the manner described above in connection with FIGS. 11A and 11B.

It has been observed that satisfaction of the strong versions of the truth promotion and participation constraints are soft constraints that can be made part of the objective function if desired. Doing so enables a tradeoff between the original objective and the strength of the truth promotion and participation constraints. In contrast, weak versions of the truth promotion and participation constraints are hard constraints that cannot be made part of the objective function.

Desirably, each constraint subsumed (mathematically implied) by an other constraint is not input into the optimizing routine to avoid unnecessary redundancy. This results in a smaller model being input into the optimizing routine, thus causing less RAM and solve time to be used, and, thus, ultimately allowing scaling to larger problems. Domain-specific knowledge enables constraints that are subsumed to be identified and thus do not ever need to be created. For example, consider an auction with one object for sale. Suppose that one of the bidders can have any one of three values, v1, v2, v3, for the object, and v1<v2<v3. Then, it can be seen that (1) the constraint that the bidder with value v1 would not want to report v2, and (2) the constraint that the bidder with value v2 would not want to report v3, together imply the constraint that the bidder with value v1 would not want to report v3. Thus, the latter constraint is subsumed and does not need to be input into the optimizing routine.

Figure 12:
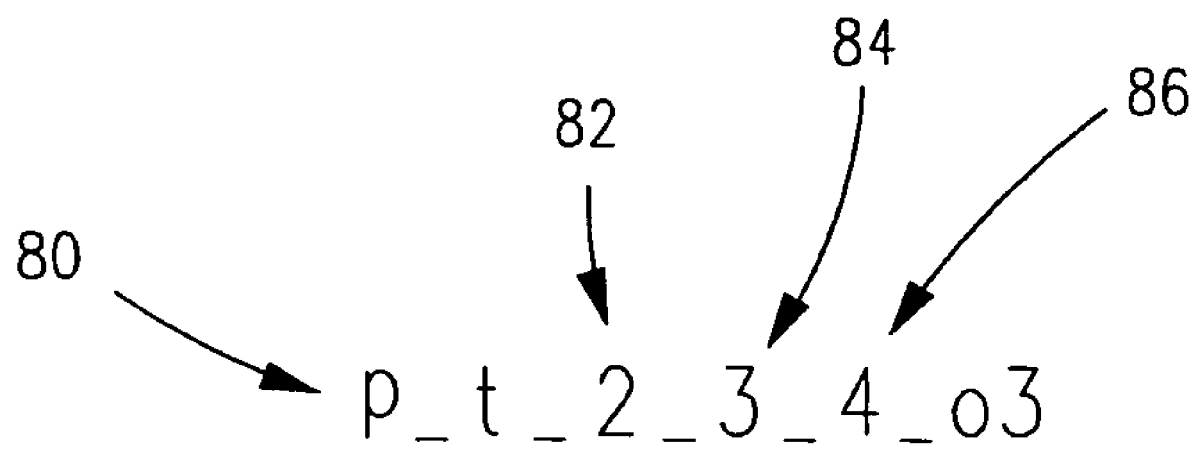
FIG. 12 is an exemplary allocation variable.

It has been observed that if one or more so-called "natural restrictions" are imposed on the final mapping, one or more exchange objective terms and/or one or more exchange constraint terms may be omitted from the coding of inputs to the optimizing routine thereby leading to a more manageable coding, file size and optimization. Examples of four of these restrictions will be described next with reference to an exemplary auction where three bidders are bidding on one item and to the exemplary allocation variable 80 shown in FIG. 12.

In this exemplary auction, outcome 1 (o1) is an allocation where bidder 1 wins the item; outcome 2 (o2) is an allocation where bidder 2 wins the item; and outcome 3 (o3) is an allocation where bidder 3 wins the item. Each allocation variable 80 of an exemplary coding for the exemplary auction includes fields 82, 84 and 86 for the bids of bidders 1, 2 and 3, respectively. Since, in this exemplary auction, each bidder will only submit one bid for the item, for simplicity of expression and discussion, fields 82, 84 and 86 of each allocation variable 80 are populated with the amount each bidder bids. For example, the allocation variable 80 shown in FIG. 12, i.e., p_t_2_3_4_o3, indicates that bidder 3 wins (outcome o3) if: bidder 1, associated with field 82, bids a value of 2; bidder 2, associated with field 84, bids a value of 3; and bidder 3, associated with field 86, bids a value of 4.

A first restriction that can be made is that only the top or best k (e.g., without limitation, k=2) bidders are eligible to win the item. Thus, if an allocation variable of the form p_t_2_3_4_o1 is included in the coding of inputs to the optimizing routine, since only the top two bidders are permitted to win the item, the value of this allocation variable can be set to zero, i.e., p_t_2_3_4_o1=0. This is so because the combination of bidder 1 bidding a value of 2 and outcome 1 (o1) where bidder 1 wins the item cannot occur (is infeasible) when bidders 2 and 3 have bid the greater values of 3 and 4, respectively.

A second restriction that can be made is that only the top or best k (e.g., without limitation, k=2) bids on each item can affect the allocation. In this case, a first allocation variable p_t_4_5_3_o1 equals a second allocation variable p_t_4_5_2_o1 since the only bid that changes is the lowest one of the three bids, i.e., the one associated with bidder 3. Thus, each instance of first allocation variable p_t_4_5_3_o1 can be replaced with second allocation variable p_t_4_5_2_o1 or vice versa.

A third restriction that can be made is that k (e.g., without limitation, 2) bidders are not to be treated differently. In this case, a first allocation variable p_t_3_1_1_o1 equals a second allocation variable p_t_1_1_3_o3 because the first bidder takes the same role in the first allocation variable as the third bidder does in the third allocation variable, i.e., their bids, as well as the bids by other bidders, are identical. Thus, each instance of first allocation variable p_t_3_1_1_o1 can be replaced with second allocation variable p_t_1_1_3_o3, or vice versa.

A fourth restriction that can be made is that better bids should not give a worse allocation for the bidder, i.e., the bidder gets less. To implement this fourth restriction, one or more so-called special constraints are included in the constraints input into the optimizing routine. For example, suppose that bidder 1 can bid a value of 1 or a value of 2 for the item. To ensure that bidder 1's bid for a value of 2 does not give a worse allocation than bidder 1's bid for a value of 1, the following special constraint is included in the constraints input into the optimizing routine: $p\_t\_2\_1\_1\_o1 \geq p\_t\_1\_1\_1\_o1$.

A fifth restriction that can be made can be described with reference to a pair of items, where the bids on one item do not affect the allocation of the other item. In a simple example of this fifth restriction with only two bidders: outcome 1 (o1) is an allocation where bidder 1 wins both items; outcome 2 (o2) is an allocation where bidder 1 wins the first item and bidder 2 wins the second item; outcome 3 (o3) is an allocation where bidder 2 wins the first item and bidder 1 wins the second item; and outcome 4 (o4) is an allocation where bidder 2 wins both items. In this example, bid "1" denotes that a bidder bids a value of 0 for item 1 and a value of 0 for item 2; bid "2" denotes that a bidder bids a value of 0 for item 1 and a value of 1 for item 2; bid "3" denotes that a bidder bids a value of 1 for item 1 and a value of 0 for item 2; and bid "4" denotes that a bidder bids a value of 1 for item 1 and a value of 1 for item 2.

If the restriction is in place that the bids on one item will not affect the allocation of the other item, then, for example, $p\_t\_3\_4\_o4 + p\_t\_3\_4\_o2 = p\_t\_1\_2\_o4 + p\_t\_1\_2\_o2$. On the left side of this equality, the number "3" indicates that bid 3 was placed bid by bidder 1 and the number "4" indicates that bid 4 was placed bid by bidder 2. On the right side of the equality, the number "1" indicates that bid 1 was placed bid by bidder 1 and the number "2" indicates that bid 2 was placed bid by bidder 2. This equality holds because the left hand side thereof indicates whether bidder 2 will receive item 2 when bidder 1 submits bid "3" (i.e., a value of 1 for item 1 and a value of 0 for item 2) and bidder 2 submits bid "4" (i.e., a value of 1 for item 1 and a value of 1 for item 2); and the right hand side of the equality indicates whether bidder 2 will receive item 2 when bidder 1 submits bid "1" (i.e., a value of 0 for item 1 and a value of 0 for item 2) and bidder 2 submits bid "2" (i.e., a value of 0 for item 1 and a value of 1 for item 2). Because the bids on item 2 are the same in either case, each instance of the left side of the foregoing equality can be replaced by the right side of the equality, or vice versa.

As can be seen, appropriate codings of inputs can be prepared depending on whether each bidder may know (strong constraints) or does not know (weak constraints) the bids of the other bidders participating in the exchange event in order to prepare a suitable mapping 42 between one or more bid vectors and one or more payment variables. The mapping prepared for each exchange event encourages bidders to bid in a manner that ensures that they are better off (from a utility standpoint) bidding truthfully. While described in connection with a simple exemplary forward auction, it is envisioned that the foregoing can be expanded readily by one of ordinary skill in the art to be applicable to more complex forward auctions, reverse auctions and/or pure exchanges.

The foregoing method of determining an allocation in a combinatorial exchange that promotes truthful bidding can be used in combination with one or more rules, generally known-as "Exchange Description Data" (EDD), that is/are associated with one or more bids received from one or more bidders and/or bid takers described in U.S. patent application Ser. No. 10/803,549, filed Mar. 18, 2004, and in U.S. patent application Ser. No. 10/254,241, filed Sep. 25, 2002, both of which are incorporated herein by reference. Non-limiting examples of such rules applicable to bidders include: one or more item attribute rules associated with one or more items of a bid and one or more bid attribute rules associated with the bid itself. Other non-limiting examples of such rules include: bid adjustment rule(s), item attribute rule(s), free disposal rule(s), action rule(s), cost constraint/requirement rule(s), unit constraint/requirement rule(s), counting constraint/requirement rule(s), homogeneity constraint rule(s), mixture constraint rule(s), cost/unit condition pricing rule(s), quote request rule(s) and reserve price rule(s). Non-limiting examples of such rules applicable to include: objective rules(s), constraint relaxer rules(s), feasibility obtainer rules(s), bid adjustment rules(s), item attribute rules(s), item adjustment rules(s), free disposal rules(s), action rules(s), cost constraint/requirement rules(s), unit constraint/requirement rules(s), counting constraint/requirement rules(s), homogeneity constraint rules(s), mixture constraint rules(s), cost/unit condition pricing rules(s), quote request rules(s) and reserved price rules(s). By way of example and not of limitation, item attribute rules and bid attribute rules will now be described.

Each item attribute rule can be utilized to complete or refine the specification for each item of a bid. An item attribute rule relates to a quality or characteristic of the corresponding item. Non-limiting examples of item attribute rules include: one or more color rules that specify acceptable (on unacceptable) colors for one or more items of the bid; a weight rule that specifies the maximum and/or minimum acceptable weight for one or more items of a bid; and a city rule that specifies the city (or other geographical location) where one or more items of a bid is/are to be shipped from. Other non-limiting examples of item attribute rules can include: width, height, purity, concentration, pH, brand, hue, intensity, saturation, shade, reflectance, origin, destination, volume, earliest pickup time, latest pickup time, earliest drop-off time, latest drop-off time, production facility, packaging and flexibility.

Each bid attribute rule can be utilized to complete or refine the specification for the corresponding bid itself. A bid attribute rule relates to a quality or characteristic of the corresponding bid. Non-limiting examples of bid attribute rules include: a credit worthiness rule whereby the credit worthiness of the bidder can be set to a level of credit worthiness of the bidder that can be taken into account when determining the allocation, e.g., bidders with good credit can be preferred over bidders with bad credit; a bidder location rule that can be populated with location of the bidder, which can be taken into account when determining the allocation, e.g., allocating a certain percentage of the allocated bids to bidders living in a particular geographical location, e.g., city, county, state, region, etc., to ensure, for example, broad market penetration; and a shipping cost rule that sets the maximum shipping cost the bidder is willing to pay for the item(s) of the bid. Other non-limiting examples of bid attribute rules can include: bidder reliability, bidder reputation, bidder timeliness, freight terms and conditions, insurance terms and conditions, bidder distance and bidder flexibility.

Each bid having two or more attribute rules (e.g., one or more item attribute rules, one or more bid attribute rules and/or some combination thereof) associated therewith is known as a so-called multi-attribute bid. Multi-attribute bids can be utilized in combination with the foregoing method of determining an allocation in a combinatorial exchange that promotes truthful bidding when determine the exchange allocation.

Each rule, including, without limitation, each bid or item attribute rule, associated with a bid or an item, respectively, can be realized as one or more corresponding constraints for processing by the optimizing software when determining the allocation. Hence, for example, each item attribute constraint relates to a quality or characteristic of the corresponding item while each bid attribute constraint relates to a quality or characteristic of the corresponding bid. When the determining the allocation, the optimizing software can determine the allocation subject to the applicable participation and truth promotion constraints as well as each constraint related to a rule.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A computer-implemented method of determining a mapping from bid vectors to allocations in a combinatorial exchange comprising:
    (a) storing in a data storage accessible to a computer a first plurality of bids, with each bid including at least one item, a quantity for each item and a price for all of the item(s) and their quantities;
    (b) a processor of the computer determining a plurality of candidate allocations of the first plurality of bids;
    (c) storing in the data storage a set of exchange objectives and a set of exchange constraints;
    (d) forming in the data storage a plurality of bid vectors, with each bid vector comprising a unique subset of the first plurality of bids stored in step (a);
    (e) storing in the data storage for each bid vector a probability value representing how likely it is the bids of said bid vector will comprise the bids from which a final allocation is determined; and
    (f) the processor of the computer determining a mapping between each bid vector and one of the candidate allocations, wherein said mapping optimizes the set of exchange objectives and satisfies the set of exchange constraints, and said mapping is determined subject to the probability values of the bid vectors, wherein:
    the set of exchange constraints includes (i) a plurality of first truth-promotion constraints or (ii) a plurality of second truth-promotion constraints;
    the plurality of first truth-promotion constraints is such that in the mapping from each bid vector to one of the candidate allocations in step (f), the utility of a bidder with a bid in the bid vector that expresses the bidder's true valuation is at least equal to the bidder's utility for a bid that does not express the bidder's true valuation, regardless of how others bid;
    the plurality of second truth-promotion constraints is such that in the mapping from each bid vector to one of the candidate allocations in step (f), the utility of a bidder with a bid in the bid vector that expresses the bidder's true valuation is at least equal to the bidder's utility for a bid that does not express the bidder's true valuation, in expectation over other bidders' truthful bids; and
    each second truth-promotion constraint is comprised of at least two first truth-promotion constraints each of which is combined with the probability value associated with at least one bid of a bidder represented by said first truth-promotion constraint.

2. The computer-implemented method of claim 1, wherein, in step (b), the plurality of candidate allocations of the bids is determined based on another set of exchange objectives and another set of exchange constraints.

3. The computer-implemented method of claim 2, wherein, either:
   each set of objectives is the same; or
   each set of objectives consists of one objective.

4. The computer-implemented method of claim 1, further including:
   (g) in connection with an actual exchange event, storing in the data storage a second plurality of bids that defines an exchange event bid vector, with each bid of the second plurality of bids including at least one item, a quantity for each item, and a price for all of the item(s) and their quantities;
   (h) the processor of the computer comparing the exchange event bid vector to at least one of the bid vectors formed in step (d); and
   (i) the processor of the computer selecting one candidate allocation as the final allocation based on the comparison in step (h) and the mapping in step (f).

5. The computer-implemented method of claim 4, wherein:
   step (h) includes comparing the items, the quantity of each item and the price of each bid of the exchange event bid vector to the items, the quantity of each item and the price of each bid of the at least one bid vector; and
   step (i) includes selecting as the final allocation the one candidate allocation to which the at least one bid vector is mapped that has the items, the quantity of each item and the price of the bids thereof that most closely match the items, the quantity of each item and the price of the bids of the exchange event bid vector.

6. The computer-implemented method of claim 5, wherein the final allocation comprises the quantity of each item allocated to each bidder having a bid included in the exchange event bid vector and the price each said bidder pays.

7. The computer-implemented method of claim 6, wherein:
   in a forward auction, the price each bidder pays for all of the bids of said bidder included in the final allocation is less than or equal to the price bid for all of said bids of said bidder included in the exchange event bid vector; and
   in a reverse auction, the price each bidder is paid for all of the bids of said bidder included in the final allocation is greater than or equal to the price bid for all of said bids of said bidder included in the exchange event bid vector.

8. The computer-implemented method of claim 4, wherein:
   the exchange event bid vector and the at least one bid vector each has an attribute associated therewith or with an item thereof;
   step (h) includes comparing the items, the quantity of each item, the price of each bid of the exchange event bid vector (EEBV) and any attribute(s) associated with the EEBV or an item thereof to the items, the quantity of each item, the price of each bid of the at least one bid vector and any attribute(s) associated with the at least one bid vector or an item thereof; and
   step (i) includes selecting as the final allocation the one candidate allocation to which the at least one bid vector is mapped that has the items, the quantity of each item, the price of the bids thereof and any attribute(s) thereof that most closely match the items, the quantity of each item, the price of the bids and any attribute(s) of the EEBV.

9. The computer-implemented method of claim 1, wherein the set of exchange constraints includes one or more constraints on at least one of the following: (1) one or more attributes of one or more items of one or more of the stored bids or (2) one or more attributes of one or more of the stored bids, wherein an item attribute relates to a quality or characteristic of the corresponding item and a bid attribute relates to a quality or characteristic of the corresponding bid.

10. The computer-implemented method of claim 1, wherein step (f) is repeated with a different set of exchange objectives, a different set of exchange constraints, or both for each repetition thereof until a desired mapping is determined.

11. The computer-implemented method of claim 10, wherein, wherein:
    each set of exchange constraints includes a plurality of participation constraints, a plurality of truth-promotion constraints, or both, and
    except for the participation constraint(s) and the truth-promotion constraint(s), each set of exchange constraints is the same.

12. The computer-implemented method of claim 1, wherein:
    the set of exchange constraints includes (i) a plurality of first participation constraints or (ii) a plurality of second participation constraints;
    the plurality of first participation constraints is such that in the mapping from each bid vector to one of the candidate allocations in step (f), a bidder with a bid in the bid vector has a higher utility from participating in the exchange than not, regardless of how others bid;
    the plurality of second participation constraints is such that in the mapping from each bid vector to one of the candidate allocations in step (f), a bidder with a bid in the bid vector has a higher utility from participating in the exchange than not, in expectation over other bidders' truthful bids; and
    each second participation constraint is comprised of at least two first participation constraints each of which is combined with a probability value associated with at least one bid of a bidder represented by said first participation constraint.

13. The computer-implemented method of claim 12, wherein each first participation constraint utilized in determining the mapping from each bid vector to one of the candidate allocations in step (f), includes at least one of the following:
    in a forward auction, a bidder with a bid in the bid vector shall not pay more in the one candidate allocation that the bid vector is mapped to than the price the bidder included in said bid;
    in a reverse auction, a bidder with a bid in the bid vector shall not be paid less in the one candidate allocation that the bid vector is mapped to than the price the bidder included in said bid;
    in a forward auction, a bidder with a bid in the bid vector shall not be awarded less in the one candidate allocation that the bid vector is mapped to than the quantity of at least one item the bidder included in said bid; and
    in a reverse auction, a bidder with a bid in the bid vector shall not be awarded more in the one candidate allocation that the bid vector is mapped to than the quantity of at least one item the bidder included in said bid.

14. The computer-implemented method of claim 12, wherein:
- in a forward auction, the utility of a bidder with a bid in the bid vector is the price included in the bidder's bid that expresses a value that the bidder believes the item(s) allocated to the bidder in the one candidate allocation that the bid vector is mapped to are worth minus the price the bidder pays in the at least one candidate allocation; and
- in a reverse auction, the utility of a bidder with a bid in the bid vector is the price the bidder is paid in the one candidate allocation that the bid vector is mapped to minus the price included in the bidder's bid that expresses a value that the bidder believes the item(s) allocated to the bidder in the one candidate allocation are worth.

15. The computer-implemented method of claim 1, wherein:
- in a forward auction, the utility of a bidder with a bid in the bid vector is the price included in the bidder's bid that expresses a value that the bidder believes the item(s) allocated to the bidder in the one candidate allocation that the bid vector is mapped to are worth minus the price the bidder pays in the one candidate allocation; and
- in a reverse auction, the utility of a bidder with a bid in the bid vector is the price the bidder is paid in the one candidate allocation that the bid vector is mapped to minus the price included in the bidder's bid that expresses a value that the bidder believes the item(s) allocated to the bidder in the one candidate allocation are worth.

16. The computer-implemented method of claim 1, wherein step (f) includes the processor of the computer determining the mapping under the control of an optimizing routine stored in the data storage.

17. The computer-implemented method of claim 1, further including the processor of the computer determining the mapping from each bid vector to one of the candidate allocations in step (f) subject to at least one of the following restrictions:
- only a fixed number of bidders with the highest bids in a bid vector are eligible to win an item;
- only a fixed number of bidders with the highest bids in a bid vector on each item can affect the mapping to the one allocation;
- a fixed subset of bidders with bids in a bid vector are treated the same in the sense that exchanging their associated bids also exchanges the roles of the bidders in the mapping to the one allocation;
- a bidder with a bid in a first bid vector submitting a bid in a second bid vector with a higher value for item(s), is not allocated less item(s) in the mapping to the one allocation associated with the second bid vector than in the mapping to the one allocation associated with the first bid vector; and
- a bid on one item does not affect an allocation of another item in the mapping to the one allocation.

18. A computer readable medium having stored thereon instructions which, when executed by a processor of a computer, cause the processor to perform the steps of:
- store in a data storage accessible to the computer a first plurality of bids, with each bid including at least one item, a quantity for each item and a value for all of the item(s) and their quantities;
- store in the data storage a first plurality of bid vectors each of which comprises a unique subset of the first plurality of bids;
- determine plural candidate allocations of the bids of a first subset of the bid vectors;
- associate with each of a second plurality of bid vectors that comprise a subset of the first plurality of bid vectors a probability value representing the likelihood that a final allocation of bids will be determined from the bids associated with said bid vector;
- determine a mapping from each bid vector of the second plurality of bid vectors to one of the candidate allocations, wherein said mapping optimizes a set of exchange objectives and satisfies a set of exchange constraints, and said mapping is determined subject to the probability values of the bid vectors;
- store in the data storage a second plurality of bids that defines an exchange event bid vector in connection with an exchange event; and
- designate as the final allocation the one candidate allocation which is mapped to the bid vector of the second plurality of bid vectors that most closely matches the exchange event bid vector, wherein:
- the set of exchange constraints includes (i) a plurality of first truth-promotion constraints or (ii) a plurality of second truth-promotion constraints;
- the plurality of first truth-promotion constraints is such that in the mapping from each bid vector to one of the candidate allocations, the utility of a bidder with a bid in the bid vector that expresses the bidder's true valuation is at least equal to the bidder's utility for a bid that does not express the bidder's true valuation, regardless of how others bid;
- the plurality of second truth-promotion constraints is such that in the mapping from each bid vector to one of the candidate allocations, the utility of a bidder with a bid in the bid vector that expresses the bidder's true valuation is at least equal to the bidder's utility for a bid that does not express the bidder's true valuation, in expectation over other bidders' truthful bids; and
- each second truth-promotion constraint is comprised of at least two first truth-promotion constraints each of which is combined with the probability value associated with at least one bid of a bidder represented by said first truth-promotion constraint.

19. The computer readable medium of claim 18, wherein each candidate allocation is determined based on another set of exchange objectives and another set of exchange constraints.

20. The computer readable medium of claim 18, wherein the set of exchange constraints includes one or more constraints on at least one of the following: (i) one or more attributes of one or more items of one or more of the stored bids or (ii) one or more attributes of one or more of the stored bids, wherein an item attribute relates to a quality or characteristic of the corresponding item and a bid attribute relates to a quality or characteristic of the corresponding bid.

21. The computer readable medium of claim 18, wherein:
- the set of constraints includes either (i) a plurality of first participation constraints or (ii) a plurality of second participation constraints;
- the plurality of first participation constraints is such that in the mapping from each bid vector to one of the candidate allocations, a bidder with a bid in the bid vector has a higher utility from participating in the exchange than not, regardless of how others bid;
- the plurality of second participation constraints is such that in the mapping from each bid vector to one of the candidate allocations, a bidder with a bid in the bid vector has a higher utility from participating in the exchange than not, in expectation over other bidders' truthful bids; and each second participation constraint is comprised of at least two first participation constraints each of which is combined with a probability value associated with at least one bid of a bidder represented by said first participation constraint.

22. The computer readable medium of claim 21, wherein each first participation constraint utilized in determining the mapping from each bid vector to one of the candidate allocations includes at least one of the following:

in a forward auction, a bidder with a bid in the bid vector shall not pay more in the one candidate allocation that the bid vector is mapped to than the price the bidder included in said bid;

in a reverse auction, a bidder with a bid in the bid vector shall not be paid less in the one candidate allocation that the bid vector is mapped to than the price the bidder included in said bid;

in a forward auction, a bidder with a bid in the bid vector shall not be awarded less in the one candidate allocation that the hid vector is mapped to than the quantity of at least one item the bidder included in said bid; and in a reverse auction, a bidder with a bid in the bid vector shall not be awarded more in the one candidate allocation that the bid vector is mapped to than the quantity of at least one item the bidder included in said bid.

23. The computer readable medium of claim 21, wherein:

in a forward auction, the utility of a bidder with a bid in the bid vector is the price included in the bidder's bid that expresses a value that the bidder believes the item(s) allocated to the bidder in the one candidate allocation that the bid vector is mapped to are worth minus the price the bidder pays in the at least one candidate allocation; and in a reverse auction, the utility of a bidder with a bid in the bid vector is the price the bidder is paid in the one candidate allocation that the bid vector is mapped to minus the price included in the bidder's bid that expresses a value that the bidder believes the item(s) allocated to the bidder in the one candidate allocation are worth.

24. The computer readable medium of claim 18, wherein:

in a forward auction, the utility of a bidder with a bid in the bid vector is the price included in the bidder's bid that expresses a value that the bidder believes the item(s) allocated to the bidder in the one candidate allocation that the bid vector is mapped to are worth minus the price the bidder pays in the one candidate allocation; and in a reverse auction, the utility of a bidder with a bid in the bid vector is the price the bidder is paid in the one candidate allocation that the bid vector is mapped to minus the price included in the bidder's bid that expresses a value that the bidder believes the item(s) allocated to the bidder in the one candidate allocation are worth.

25. The computer readable medium of claim 18, wherein the step of determining a mapping includes determining a plurality of mappings utilizing a different set of exchange objectives, a different set of exchange constraints, or both for each mapping until a desired mapping is found.

26. The computer readable medium of claim 18, wherein the step of determining a mapping includes the processor of the computer determining the mapping under the control of an optimizing routine stored in the data storage.

27. The computer readable medium of claim 18, wherein:

each set of exchange constraints includes a plurality of participation constraints or a plurality of truth-promotion constraints; and except for the participation constraint(s) and the truth-promotion constraint(s), each set of exchange constraints is the same.

28. The computer readable medium of claim 18, further including determining the mapping from each bid vector to one of the candidate allocations as a function of at least one of the following restrictions:

only a fixed number of bidders with the highest bids in a bid vector are eligible to win an item;

only a fixed number of bidders with the highest bids in a bid vector on each item can affect the mapping to the one allocation;

a fixed subset of bidders with bids in a bid vector are treated the same in the sense that exchanging their associated bids also exchanges the roles of the bidders in the mapping to the one allocation;

a bidder with a bid in a first bid vector submitting a bid in a second bid vector with a higher value for item(s), is not allocated less item(s) in the mapping to the one allocation associated with the second bid vector than in the mapping to the one allocation associated with the first bid vector; and a bid on one item does not affect an allocation of another item in the mapping to the one allocation.

* * * * *

UNITED STATES PATENT AND TRADEMARK OFFICE
CERTIFICATE OF CORRECTION

PATENT NO.      : 8,060,433 B2
APPLICATION NO. : 11/649082
DATED           : November 15, 2011
INVENTOR(S)     : Vincent Conitzer et al.

It is certified that error appears in the above-identified patent and that said Letters Patent is hereby corrected as shown below:

Column 24, Line 17, Claim 11, delete "wherein, wherein:" and insert -- wherein: --

Signed and Sealed this
Twenty-eighth Day of February, 2012

David J. Kappos
*Director of the United States Patent and Trademark Office*